United States Patent
Matsushita et al.

(10) Patent No.: US 7,781,948 B2
(45) Date of Patent: Aug. 24, 2010

(54) LIGHT SOURCE DEVICE INCLUDING A GAS DISCHARGE TUBE, A HOUSING, AND AN INSULATING SOCKET MEMBER

(75) Inventors: Koji Matsushita, Hamamatsu (JP); Kazuo Ueno, Hamamatsu (JP); Kouzou Adachi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 315 days.

(21) Appl. No.: 11/883,998

(22) PCT Filed: Feb. 10, 2006

(86) PCT No.: PCT/JP2006/302365
§ 371 (c)(1),
(2), (4) Date: Aug. 9, 2007

(87) PCT Pub. No.: WO2006/087976
PCT Pub. Date: Aug. 24, 2006

(65) Prior Publication Data
US 2008/0143232 A1    Jun. 19, 2008

(30) Foreign Application Priority Data
Feb. 17, 2005    (JP) .............................. 2005-041190

(51) Int. Cl.
*F21V 21/00*    (2006.01)
*F21V 29/00*    (2006.01)
(52) U.S. Cl. ...................... 313/25; 313/46; 313/318.01; 313/49; 362/294
(58) Field of Classification Search ................. 313/634, 313/318.01, 609, 611, 613, 46, 25, 49; 362/294
See application file for complete search history.

(56) References Cited

U.S. PATENT DOCUMENTS

| 6,741,036 | B1 * | 5/2004 | Ikedo et al. | .................. 313/634 |
| 2002/0060909 | A1 * | 5/2002 | Sei et al. | ..................... 362/236 |
| 2004/0032740 | A1 * | 2/2004 | Kurashima et al. | .......... 362/373 |
| 2008/0180027 | A1 * | 7/2008 | Matsushita et al. | .......... 313/634 |

FOREIGN PATENT DOCUMENTS

EP    1 113 483    7/2001
JP    56-41490    9/1979

(Continued)

*Primary Examiner*—Karabi Guharay
(74) *Attorney, Agent, or Firm*—Drinker Biddle & Reath LLP

(57) ABSTRACT

The present invention relates to a light source apparatus with a structure that improves the positioning precision of a gas discharge tube and facilitates gas discharge tube maintenance work. The light source apparatus has a lamp container housing the gas discharge tube, and an insulating socket member that is fixed in a state of being positioned with respect to the lamp container and that is housed in the lamp container together with the gas discharge tube. The insulating socket member has a plane contacting portion put in plane contact with a stem portion of the gas discharge tube, and a pin socket member into which at least one of stem pins, held in the stem portion is inserted in an electrically contacting state. By the corresponding stem pin being inserted in the pin socket member, the gas discharge tube is fixed in a manner enabling attachment and detachment with respect to the insulating socket member, and the precision of positioning of the gas discharge tube with respect to the lamp container is thereby improved dramatically. Also, because the insulating socket member fixes the gas discharge tube in a detachable state, detachment of the gas discharge tube is facilitated and consequently, exchange of the gas discharge tube and other maintenance work are facilitated.

5 Claims, 31 Drawing Sheets

FOREIGN PATENT DOCUMENTS

| | | |
|---|---|---|
| JP | 58-13688 | 1/1983 |
| JP | 59-93086 | 6/1984 |
| JP | 60-48687 | 4/1985 |
| JP | 4-98777 | 3/1992 |
| JP | 6-60019 | 8/1994 |
| JP | 11-344435 | 12/1999 |
| JP | 2000-315417 | 11/2000 |
| JP | 2001-176304 | 6/2001 |
| JP | 2001-256924 | 9/2001 |
| WO | 00/14770 | 3/2000 |
| WO | 01/06173 | 1/2001 |
| WO | 01/91160 | 11/2001 |

* cited by examiner

LIGHT SOURCE DEVICE INCLUDING A GAS DISCHARGE TUBE, A HOUSING, AND AN INSULATING SOCKET MEMBER

TECHNICAL FIELD

The present invention relates to a light source apparatus, having a gas discharge tube that emits light of a predetermined wavelength and enabling use as a light source of an analyzing apparatus, a semiconductor inspection apparatus, and the like.

BACKGROUND ART

In the field of art of analyzing apparatuses, semiconductor inspecting apparatuses, etc., conventional light source apparatuses, such as described in Patent Documents 1 are known. The light source apparatus described in Patent Document 1 has a base plate provided with a plurality of insertion holes, and a gas discharge tube is positioned by stem pins of the gas discharge tube being inserted into the insertion holes. After positioning, the stem pins of the gas discharge tube are fixed to the base plate by soldering.

Patent Document 1: Japanese Patent Application Laid-Open No. H4-98777

DISCLOSURE OF THE INVENTION

Problems that the Invention is to Solve

The present inventors have examined conventional light source apparatuses, and as a result, have discovered the following problems. That is, in the structure of the conventional light source apparatus described in Patent Document 1, because a gap is formed between the gas discharge tube and the base plate, the work of positioning the gas discharge tube is difficult and further improvement of the positioning precision is demanded. Also, with the gas discharge tube, because the stem pins are fixed to the base plate by soldering, exchange of the gas discharge tube and other maintenance work are difficult tasks.

The present invention has been developed to eliminate the problems described above. It is an object of the present invention to provide a light source apparatus with a structure that improves the positioning precision of a gas discharge tube and facilitates gas discharge tube maintenance work.

Means for Solving the Problems

A light source apparatus according to the present invention comprises a gas discharge tube having a stem portion that holds a plurality of stem pins in penetrating states, a lamp container housing the gas discharge tube, and an insulating socket member housed in the lamp container together with the gas discharge tube. The insulating socket member is disposed between the gas discharge tube and the lamp container and is fixed in a state of being positioned with respect to the lamp container. The insulating socket member is comprised of an electrically insulating material and has a structure for fixing the gas discharge tube in a detachable state. In particular, the insulating socket member has a plane contacting portion that is put in plane contact with the stem portion of the gas discharge tube and a pin socket member that is disposed in correspondence to at least one of the stem pins. The corresponding stem pin is inserted in an electrically connected state in the pin socket member. By the stem pin being inserted into the pin socket member, the gas discharge tube is fixed in a manner enabling attachment and detachment with respect to the insulating socket member.

In the light source apparatus with the above-described structure, the insulating socket member has the pin socket member into which a corresponding stem pin extending from the stem portion toward the exterior of the gas discharge tube is inserted. In this case, the insulating socket member is put in plane contact with the stem portion and the gas discharge tube can be fixed in close contact in a detachable state. Thus, in comparison to the conventional light source apparatus having a gap between the stem portion and the base plate, the positioning precision of the gas discharge tube can be improved dramatically. Also, because the stem portion is fixed in close contact to the insulating socket member, the stability upon fixing of the gas discharge tube is increased in comparison to the conventional light source apparatus, in which the gas discharge tube is fixed via the stem pins. Furthermore, because the gas discharge tube is fixed detachably to the insulating socket member, detachment of the gas discharge tube is facilitated, and as a result, exchange of the gas discharge tube and other maintenance work can be performed readily.

As a preferable arrangement that exhibits the above effects, the light source apparatus according to the present invention furthermore includes a base, on a surface of which the lamp container is fixed. Also, the lamp container preferably has a box-like shape and has wall surfaces that are substantially orthogonal to the base. The insulating socket member may be fixed to an above-mentioned wall surface.

In the light source apparatus according to the present invention, in a case where the gas discharge tube has an evacuation tube portion extending from the stem portion toward the exterior of the gas discharge tube, the insulating socket member preferably has an evacuation tube entry portion for entry of the evacuation tube portion.

The insulating socket member may have stem pin entry portions for entry of the stem pins, and in this case, the pin socket member is inserted in and attached to a predetermined stem pin entry portion.

Furthermore, the lamp container may have a light emitting portion that transmits the light from the gas discharge tube to the exterior of the lamp container, and a lens may be held in the light emitting portion.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

Effects of the Invention

In the light source apparatus according to the present invention, because the gas discharge tube can be fixed in close contact to the insulating socket member, the positioning precision of the gas discharge tube can be improved and the fixing of the gas discharge tube can be stabilized in comparison to the conventional arrangement. Also, because the gas discharge tube can be detached easily, gas discharge tube maintenance work is facilitated.

Figure 1:
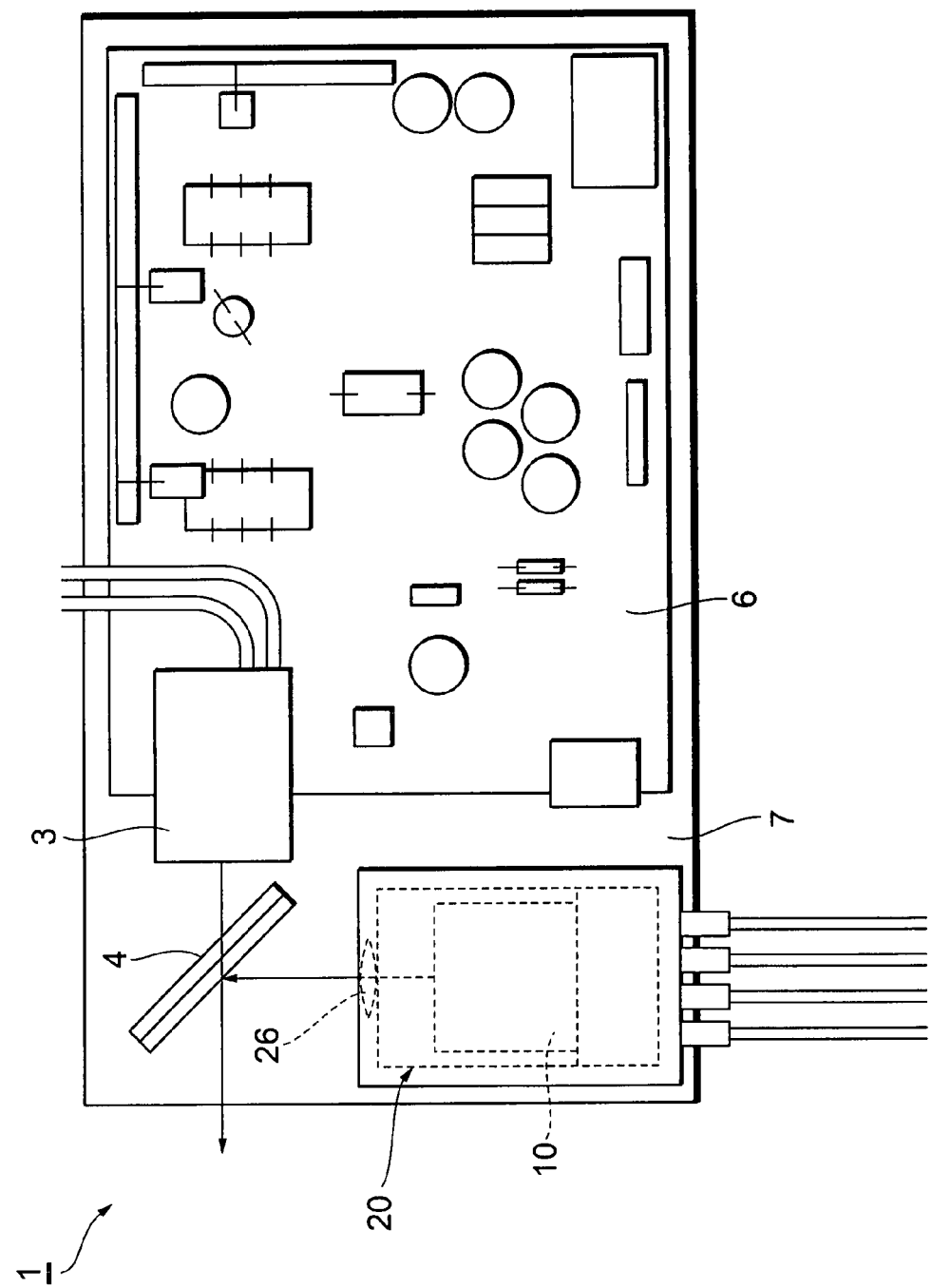
FIG. 1 is a diagram of a general arrangement of a first embodiment of a light source apparatus according to the present invention.

DESCRIPTION OF THE REFERENCE NUMERALS 1, 41, 56, 66, 76 . . . light source apparatus; 7, 67 . . . base, 10 . . . deuterium lamp (gas discharge tube); 11$b$ . . . stem portion; 11$d$ . . . evacuation tube portion; 19$a$-19$i$ . . . stem pin; 20, 40, 50, 60, 70 . . . lamp box (lamp container); 22 . . . lamp fixing plate (wall surface); 23$a$ . . . light emitting portion; 26 . . . lens; 30, 80, 90, 100, 110, 120, 130, 140 . . . heat insulating socket member (insulating socket member); 30$a$, 101$a$, 121$a$ . . . plane contact portion; 31, 91, 131 . . . evacuation tube entry portion; 32$a$-32$i$, 82$d$, 82$f$, 82$h$, 82$i$ . . . stem pin entry portion; and 33$a$-33$e$, 113$a$-113$e$ . . . pin socket member.

BEST MODES FOR CARRYING OUT THE INVENTION

Figure 2:
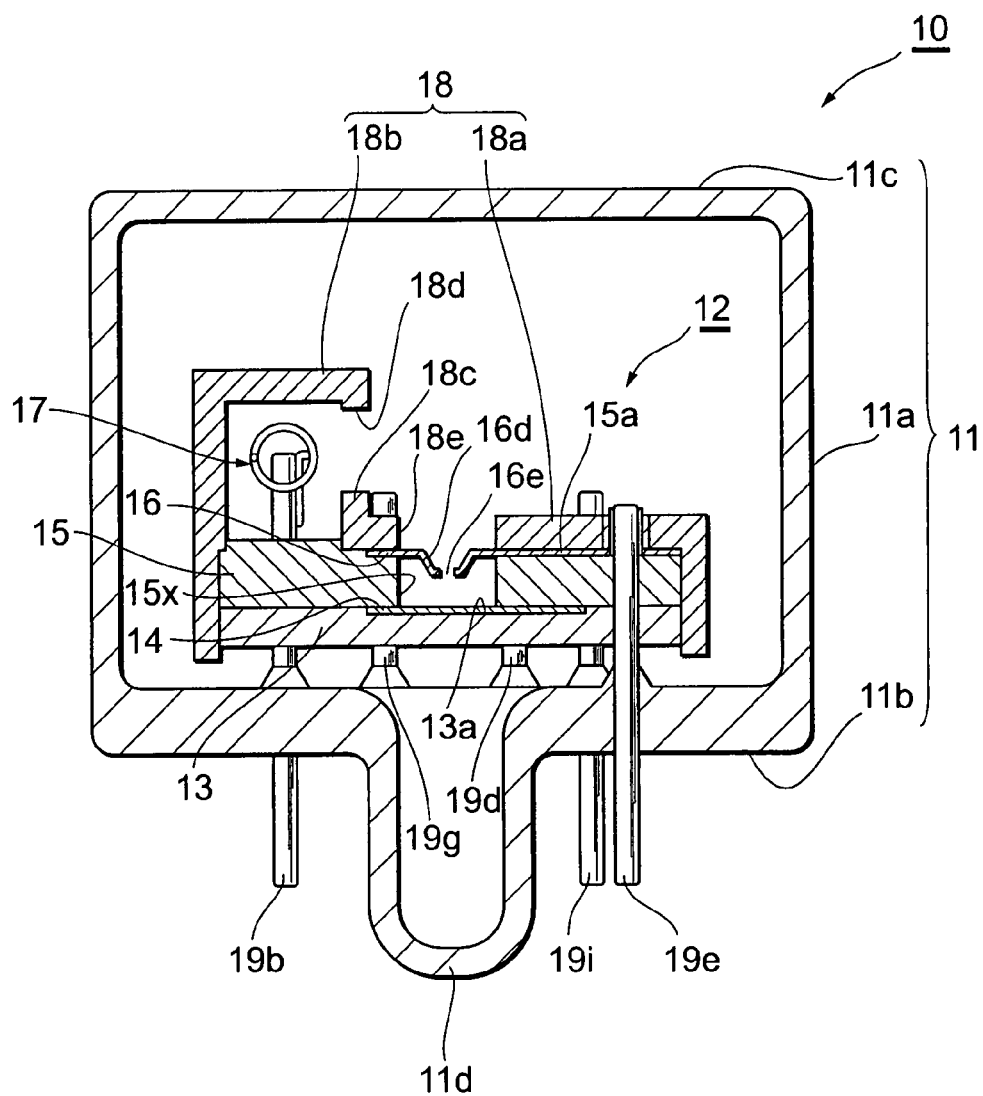
FIG. 2 is a sectional view of an internal structure of a deuterium lamp shown in FIG. 1.
Figure 3:
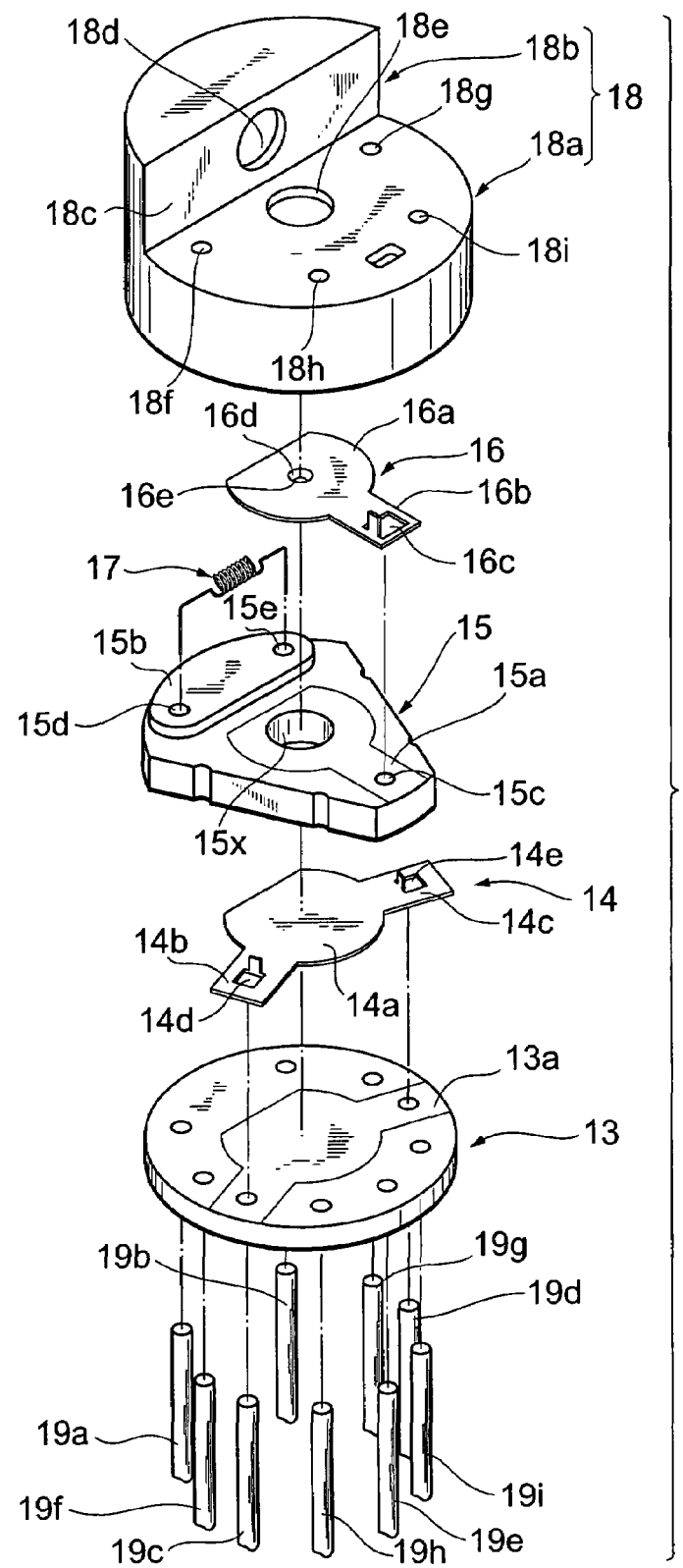
FIG. 3 is an exploded perspective view of a light emitting assembly of the deuterium lamp shown in FIG. 2.
Figure 4:
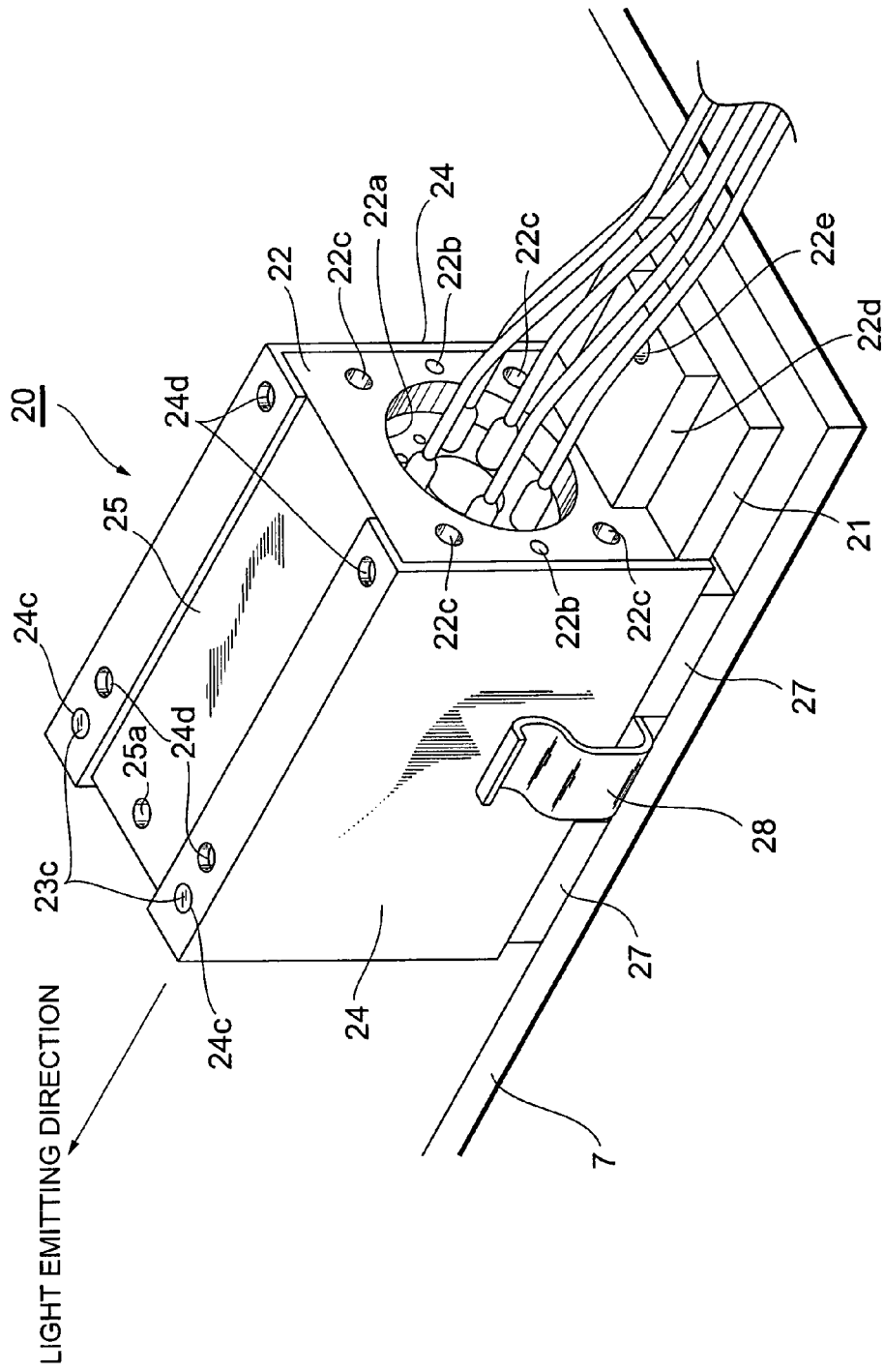
FIG. 4 is a perspective view of a structure of a lamp box shown in FIG. 1.
Figure 5:
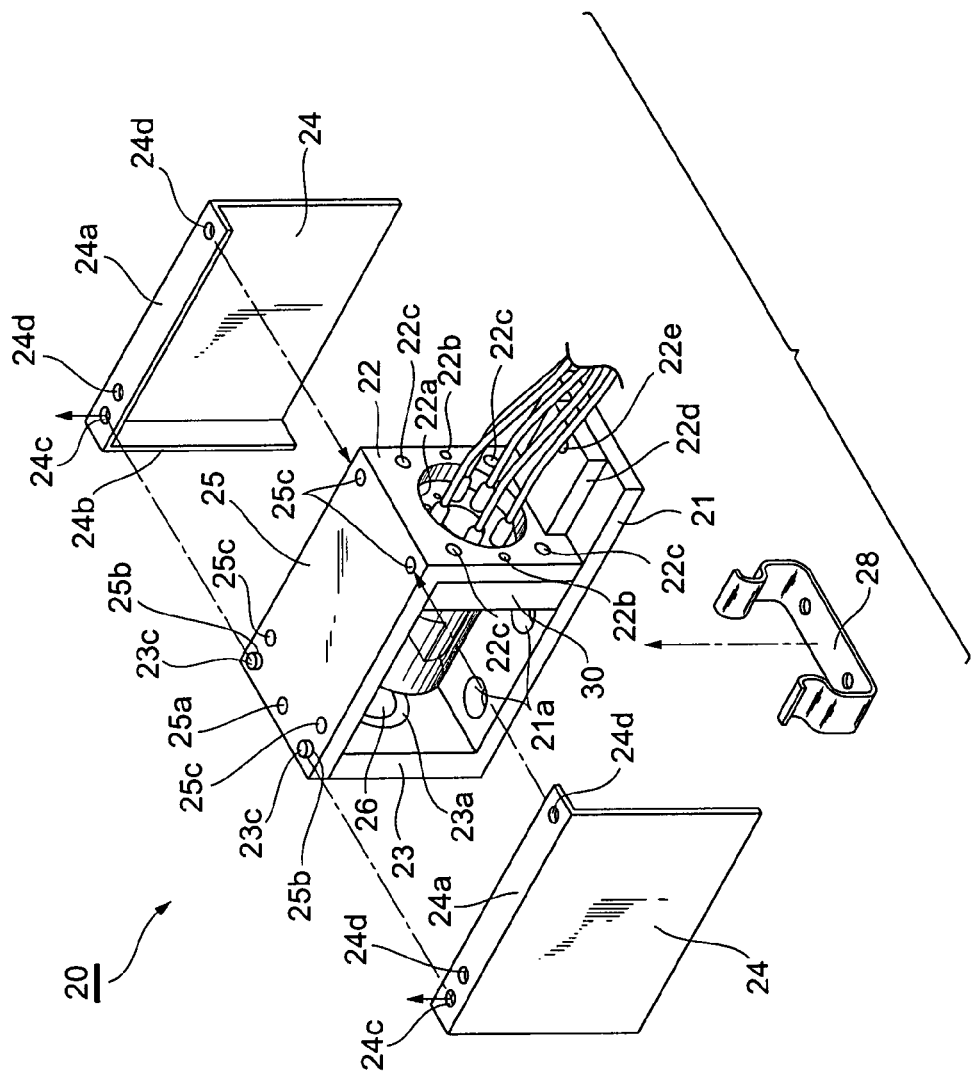
FIG. 5 is an exploded perspective view of an internal state of the lamp box (internal state in which the deuterium lamp is housed) of FIG. 4.
Figure 6:
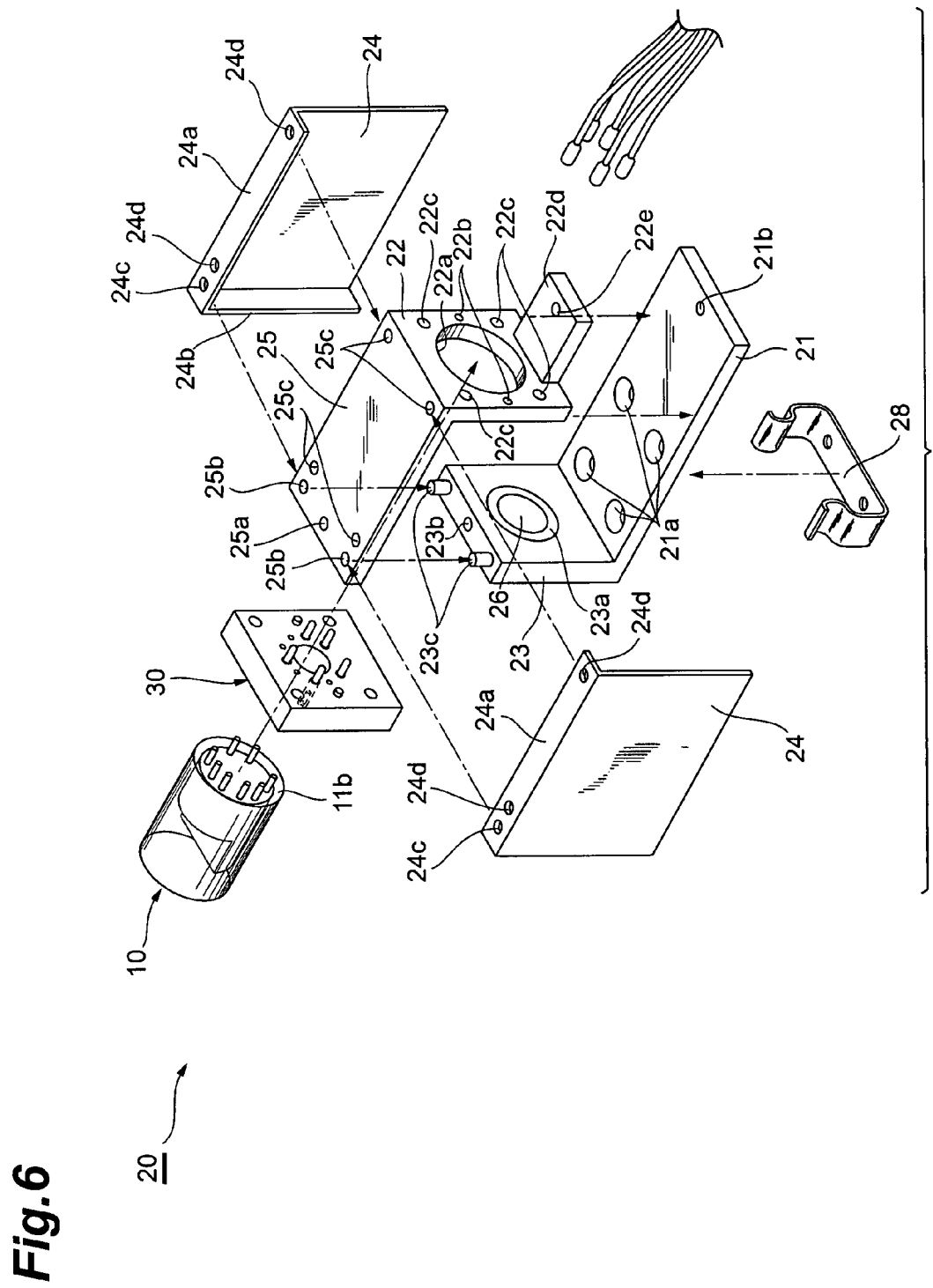
FIG. 6 is an exploded perspective view of details of the internal state of the lamp box of FIG. 4.
Figure 7:
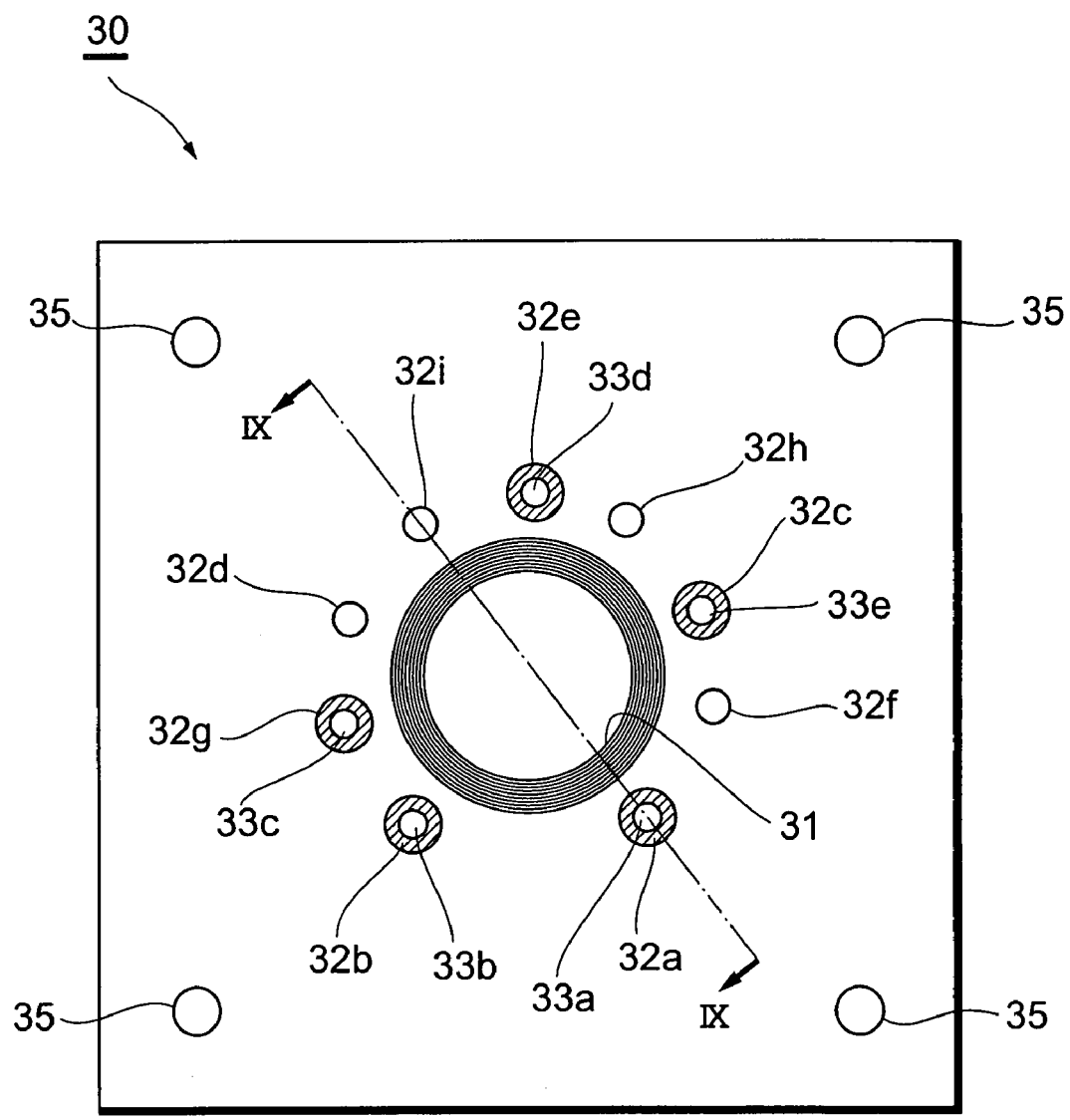
FIG. 7 is a front view of a structure of a heat insulating socket member shown in FIG. 6.
Figure 8:
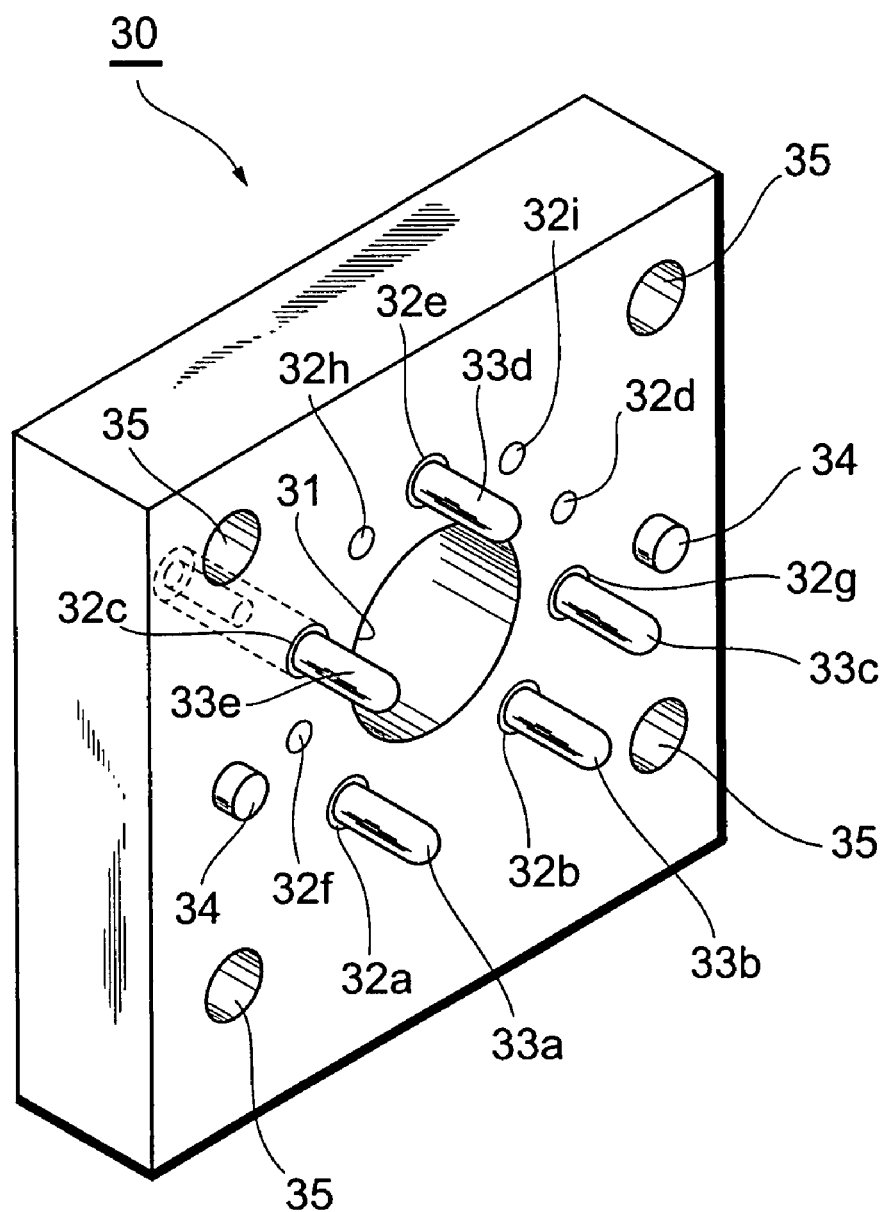
FIG. 8 is a perspective view of the structure of the heat insulating socket member, shown in FIG. 6, as viewed from a back side.
Figure 9:
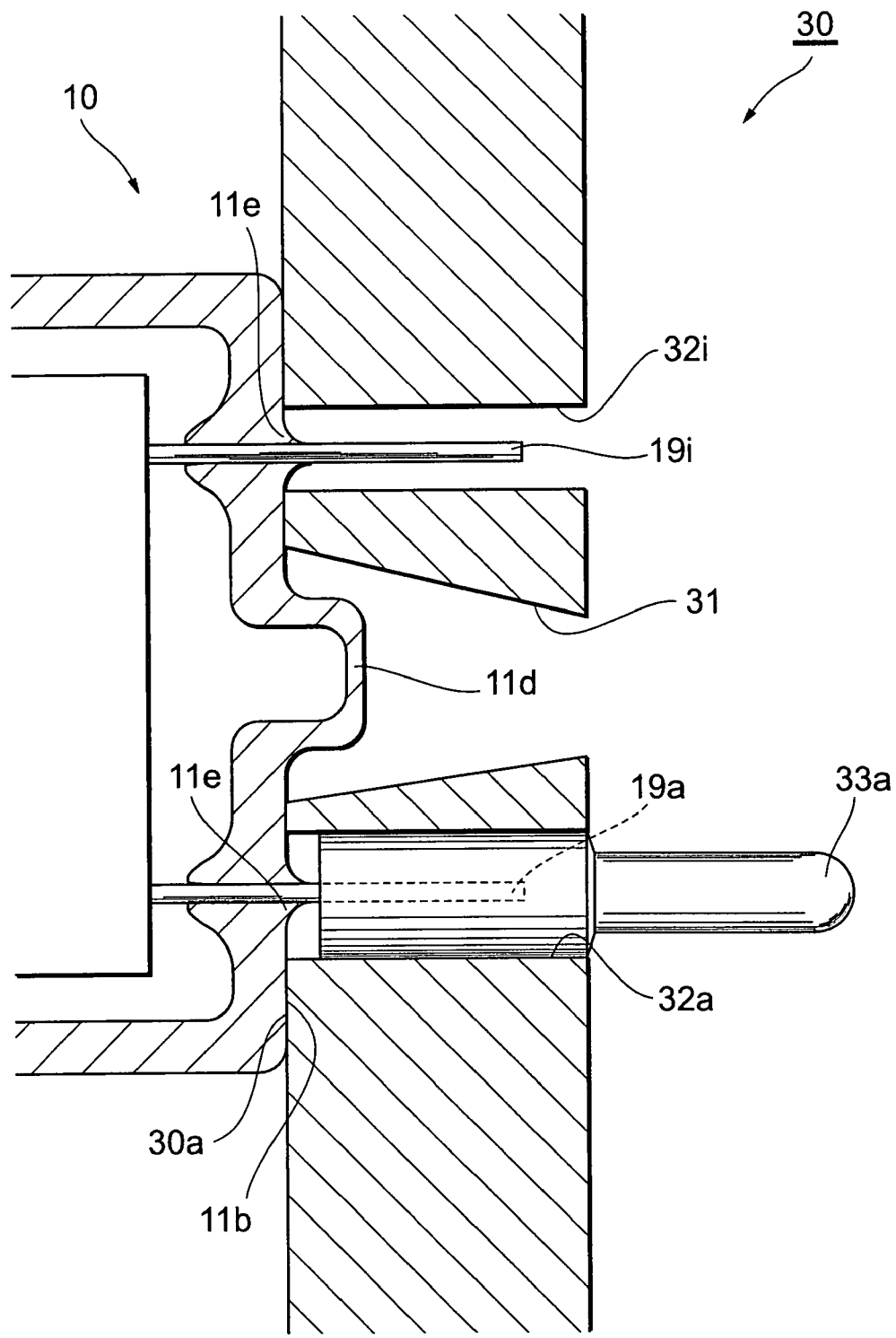
FIG. 9 is a diagram of a sectional structure along line IX-IX of the heat insulating socket (FIG. 7) in the state in which the deuterium lamp is fixed.
Figure 10:
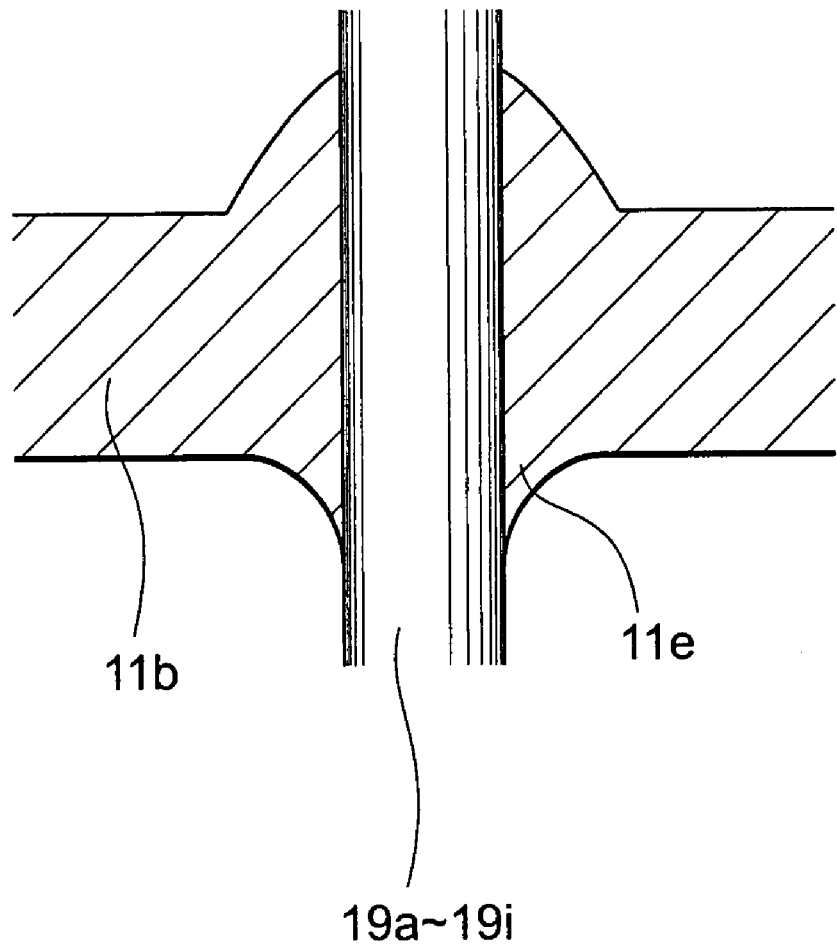
FIG. 10 is an enlarged sectional view of a stem pin penetration portion of the deuterium lamp of FIG. 9.

In the following, embodiments of a light source apparatus according to the present invention will be explained in detail using FIGS. 1 to 31. In the description of the drawings, identical or corresponding components are designated by the same reference numerals, and overlapping description is omitted. FIG. 1 is a diagram of a general arrangement of a first embodiment of a light source apparatus according to the present invention, FIG. 2 is a sectional view of a structure of a deuterium lamp shown in FIG. 1, FIG. 3 is an exploded perspective view of a light emitting assembly shown in FIG. 2, FIG. 4 to FIG. 6 are diagrams of a structure of a lamp box shown in FIG. 1, FIG. 7 and FIG. 8 are diagrams of a structure of a heat insulating socket member shown in FIG. 6, FIG. 9 is a diagram of a sectional structure along line IX-IX of the heat insulating socket (FIG. 7) in the state in which the deuterium lamp is fixed, and FIG. 10 is an enlarged sectional view of a stem pin penetration portion of the deuterium lamp of FIG. 9.

The light source apparatus 1, shown in FIG. 1, is used, for example, as a light source of an analyzing apparatus, etc., and has the deuterium lamp (gas discharge tube) 10 that emits ultraviolet light of a predetermined wavelength. The ultraviolet light, which is emitted from the deuterium lamp 10 and collimated by a lens 26, and an emitted light from a halogen lamp 3 are synthesized by a beam splitter 4 and the synthesized light is emitted from the light emitting apparatus 1. By this arrangement, saturation of a detector of the analyzing apparatus is prevented and effective use is made of the dynamic range of the detector.

The light source apparatus 1 furthermore has the lamp box (lamp container) 20, housing the deuterium lamp 10, and a lamp drive circuit board 6, in turn having a lamp drive circuit. The lamp box 20, the beam splitter 4, the halogen lamp 3, and the lamp drive circuit board 6 are fixed at predetermined positions of the base 7 to make the light source apparatus 1 compact.

The deuterium lamp 10 shall now be described in detail. The deuterium lamp 10 is a so-called head-on type deuterium lamp and, as shown in FIG. 2, has a sealed container 11, made of glass, and a light emitting assembly 12, housed in the sealed container 11.

The sealed container 11 has a cylindrical side tube portion 11a, a stem portion 11b, sealing a lower end of the side tube portion 11a, and a light emitting window 11c, sealing an upper end of the side tube portion 11a. Deuterium gas of approximately several hundred Pa is sealed inside the sealed container 11. A plurality (nine in the present embodiment) of conductive stem pins 19a to 19i (see FIG. 3) are respectively inserted through, sealed, and fixed along a predetermined circumference to the stem portion 11b. An evacuation tube portion 11d, which protrudes outward (downward in the figure), is formed at a center of the stem portion 11b.

The light emitting assembly 12 that is housed inside the sealed container 11 functions as a light source that emits ultraviolet rays. As shown in FIG. 2 and FIG. 3, the light emitting assembly 12 has a base portion 13, an anode portion 14, a discharge path restricting portion fixing plate 15, a discharge path restricting portion 16, and a cathode portion 17, which are positioned in that order from the lower side, and a cathode portion cover 18 that covers these components.

As shown in FIG. 3, the base portion 13 is comprised of electrically insulating ceramic and has a disk shape. A plurality of openings are formed along a circumferential edge of the base portion 13, and the stem pins 19a to 19i are respectively passed through these openings. A shallow, recessed portion 13a, the shape of which corresponds to the shape of the anode portion 14, is formed on an upper surface of the base portion 13 to house and position the anode portion 14.

The anode portion 14 is a thin, conductive plate and has a substantially disk-like main body portion 14a and a pair of extending portions 14b and 14c that extend horizontally in radial directions from two locations of the circumferential edge of the main body portion 14a. As shown in FIG. 2, the anode 14 is housed in the recessed portion 13a of the base portion 13 with its upper surface being matched to the upper surface of the base portion 13. As shown in FIG. 3, openings 14d and 14e are provided in the extending portions 14b and 14c of the anode portion 14, and front ends of the stem pins 19c and 19d are electrically connected to these openings 14d and 14e.

The discharge path restricting portion fixing plate 15 is comprised of ceramic and has a substantially fan-like shape. This discharge path restricting portion fixing plate 15 is set so as to overlap with substantially central portions of the base portions 13 and the anode portion 14. At substantially the center of the discharge path restricting portion fixing plate 15, an opening 15x that exposes the main body portion 14a of the anode portion 14 is formed so as to allow a discharge path, formed between the anode portion 14 and the cathode portion 17, to pass through. On an upper surface of a narrow-width side (right side in the figure) of the discharge path restricting portion fixing plate 15 that includes the opening 15x is formed a shallow recessed portion 15a, with a shape corresponding to the discharge path restricting portion 16, for housing and positioning the discharge path restricting portion 16. On an upper surface of a wide-width side (left side in the figure) of the discharge path restricting portion fixing plate 15 is disposed a protruding portion 15b for erecting the cathode portion 17. At a narrow-width side position of the recessed portion 15a of the discharge path restricting portion fixing plate 15 is formed an opening 15c, and the stem pin 19e is passed through this opening 15c. A pair of openings 15d and 15e are formed in the protruding portion 15b of the discharge path restricting portion fixing plate 15, and the stem pins 19a and 19b are respectively passed through these openings 15d and 15e.

The discharge path restricting portion 16 is a thin, conductive plate and has a substantially disk-like main body portion 16a and an extending portion 16b that extends horizontally in a radial direction from a circumferential edge of the main body portion 16a. As shown in FIG. 2, the discharge path restricting portion 16 is housed in the recessed portion 15a of the discharge path restricting portion fixing plate 15 with its upper surface being matched with the upper surface of the discharge path restricting portion fixing plate 15. As shown in FIG. 3, an opening 16c is formed in the extending portion 16b of the discharge path restricting portion 16, and a front end of the stem pin 19e is electrically connected to this opening 16c.

Also, as shown in FIG. 2 and FIG. 3, with the discharge path restricting portion 16, a recessed portion 16d, for forming an arc ball, is formed at a position that is coaxial to the opening 15x of the discharge path restricting portion fixing plate 15. In order to take out light efficiently, the recessed portion 16d has a function of containing the arc ball, formed by discharge, and has a cup shape that widens toward the light emitting window 11c. A small-diameter, discharge path constricting opening 16e with a diameter of approximately 0.5 mm is formed in a bottom surface of the recessed portion 16d of the discharge path restricting portion 16. An arc ball of flat, ball-like shape can thereby be formed inside the recessed portion 16d.

The cathode portion 17 has a coil (filament coil) as a heater, and a thermal electron emitting substance, such as barium oxide, is coated on this heater. As shown in FIG. 3, with such a cathode portion 17, respective ends of the coil are erected upon being passed through the openings 15d and 15e of the protruding portion 15b of the discharge path restricting portion fixing plate 15 and are electrically connected to the stem pins 19a and 19b that are passed through the openings 15d and 15e.

As shown in FIG. 2 and FIG. 3, the cathode portion cover 18 has a cylindrical shape. The cathode portion cover 18 has an anode side covering portion 18a and a cathode side covering portion 18b. The anode side covering portion 18a covers an assembly of the anode portion 14, the discharge path restricting portion 16, etc. The cathode side covering portion 18b is disposed so as to be in communication with the space inside the anode side covering portion 18a when the cathode portion 17 is covered. The cross-sectional shape of the cathode side covering portion 18b is that of a smaller portion that is formed when a cylinder that is coaxial to and of the same diameter as the anode side covering portion 18a is cut vertically along an axial line direction at a position that does not include the axial line. The anode side covering portion 18a and the cathode side covering portion 18b are comprised of integrally formed ceramic.

At the cathode side covering portion 18b of the cathode portion cover 18, a slit 18d, for emission of electrons, is formed as an opening in a slit plate portion 18c at the side of an axial center of the discharge path constricting opening 16e (electron emission side of the cathode portion 17). Meanwhile, at the anode side covering portion 18a, an opening 18e, through which the discharge path passes through, is formed at a position coaxial to the opening 15x of the discharge path restricting portion fixing plate 15 and the discharge path constricting opening 16e of the discharge path restricting portion 16. In order to achieve a high discharge efficiency, the opening 18e has a size such that the discharge path restricting portion 16 is not exposed more than necessary. Also, as shown in FIG. 3, openings 18f to 18i are formed in the anode side covering portion 18a. Front ends of the remaining stem pins 19f to 19i, which are positioned at outer sides of the anode portion 14 and the discharge path restricting portion fixing plate 15 and extend upward, are connected and fixed to the openings 18f to 18i. By this arrangement, the cathode portion cover 18 is fixed to the front ends of the stem pins 19a to 19i, and the anode portion 14, the discharge path restricting portion fixing plate 15, and the discharge path restricting portion 16 are disposed overlappingly between the cathode portion cover 18 and the base portion 13.

Next, the lamp box 20, which houses the deuterium lamp 10 that is arranged as described above, shall now be described in detail. As shown in FIG. 4 to FIG. 6, the lamp box 20 has a box-like shape. The lamp box 20 has a bottom plate 21, fixed to the base 7, a lamp fixing plate 22, orthogonal to the bottom plate 21, a light emitting plate 23, a pair of side surface plates 24, and a top plate 25, constituting an upper wall surface of the lamp box 20. An outer shell of the lamp box 20 is defined by the bottom plate 21, the lamp fixing plate 22, the light emitting plate 23, the pair of side surface plates 24, and the top plate 25.

As shown in FIG. 6, the bottom plate 21 has, near its corner portions, openings 21a for fixing the bottom plate 21 to the base 7 by screws. The light emitting plate 23 is erected at one end in the longitudinal direction of the bottom plate 21, and a female thread portion 21b, for fixing the lamp fixing plate 22, is formed near the other end. The bottom plate 21 is fixed by screws to the base 7 via heat insulating materials 27 as shown in FIG. 4.

As shown in FIG. 5, the lamp fixing plate 22 is a member to which the stem portion 11b (see FIG. 2 and FIG. 6) of the deuterium lamp 10 is fixed via the heat insulating socket member (insulating socket member) 30 to be described later. As shown in FIG. 4 to FIG. 6, with the lamp fixing plate 22, an opening 22a, for exposing a central portion of the heat insulating socket member 30, is formed at a central portion, and small holes 22b, for performing positioning of the heat insulating socket member 30, are formed at both sides in the horizontal direction of the opening 22a. Furthermore, near corner portions of the lamp fixing plate 22 are formed female thread portions 22c for fixing the heat insulating socket member 30. A plate-like extending portion 22d that extends outward (in the left-right direction in the figure) is disposed at a lower end of the lamp fixing plate 22, and an opening 22e, for fixing the lamp fixing plate 22 to the bottom plate 21 by a screw, is formed in the extending portion 22d.

As shown in FIG. 5, the light emitting plate 23 constitutes an integral part together with the bottom plate 21 and is a wall surface that extends upward from one end of the bottom plate 21 so as to oppose the lamp fixing plate 22 across the deuterium lamp 10. As shown in FIG. 5 and FIG. 6, a light emitting portion 23a that allows emitted light from the deuterium lamp 10 to be emitted out of the lamp box 20 is formed at a central portion of the light emitting plate 23, and a lens 26 is held in the light emitting portion 23a. As shown in FIG. 6, at a center of an upper end surface of the light emitting plate 23 is disposed a female thread portion 23b for fixing the top plate 25 by a screw, and at both sides of the female thread portion 23b are erected positioning pins 23c for the positioning of the top plate 25.

As shown in FIG. 5, the top plate 25 constitutes an integral part together with the lamp fixing plate 22 and is a wall surface that extends horizontally from an upper end of the lamp fixing plate 22 to an upper end of the light emitting plate 23 so as to oppose the bottom plate 21 across the deuterium lamp 10. As shown in FIG. 6, with the top plate 25, an opening 25a and positioning holes 25b are disposed at positions respectively corresponding to the female thread portion 23b and the positioning pins 23c of the light emitting plate 23. A male screw is screwed into the female thread portion 23b via the opening 25a with the positioning pins 23c being inserted through the positioning holes 25b. The top plate 25 and the lamp fixing plate 22 are furthermore positioned and fixed by a male screw being screwed into the female thread portion 21b via the opening 22e. The lamp fixing plate 22 and the top plate 25 are thus detachably fixed to the bottom plate 21 and the light emitting plate 23. Also, a plurality of female thread portions 25c, for fixing upper ends of the side surface plates 24, are formed near sides of the top plate 25.

As shown in FIG. 4 to FIG. 6, the pair of side surface plates 24 are members that constitute side walls of the lamp box 20. These side surface plates 24 are positioned opposite each other across the deuterium lamp 5 as shown in FIG. 5. An upper end of each side surface plate 24 is bent and this bent portion constitutes an upper end plate 24a that faces an upper surface of the top plate 25. An end at the light emitting plate 23 side of each side surface plate 24 is also bent and this bent portion constitutes a front end plate 24b that faces a front end of the light emitting plate 23. Openings 24c and 24d that respectively correspond to the positioning pin 23c of the light emitting plate 23 and the female thread portions 25c of the top plate 25 are formed in the upper end plate 24a of each side surface plate 24. By inserting the positioning pin 23c through the opening 24c and screwing male screws into the female thread portions 25c via the openings 24d with the upper end plate 24a being overlapped onto the top plate 25, each side surface plate 24 is fixed to the top plate 25. These side surface plates 24 are urged inward by a plate spring 28, formed by bending a thin plate and extending to outer surfaces of the side surface plates from a lower side of the bottom plate 21. That is, the pair of side surface plates 24 are detachably attached with respect to the bottom plate 21, the lamp fixing plate 22, the light emitting plate 23, and the top plate 25.

The heat insulating socket member 30 for fixing the deuterium lamp 10 to the lamp box 20 shall now be described in detail. As shown in FIG. 5 and FIG. 6, the heat insulating socket member 30 has a plate shape and is a member that fixes the deuterium lamp 10 to the lamp fixing plate 22 while holding the stem portion 11b side of the deuterium lamp 10 as mentioned above. In regard to portions of the heat insulating socket member 30, a side at which the deuterium lamp 10 is held shall be referred to as a "front side" and a side that is fixed to the lamp fixing plate 22 shall be referred to as a "back side" in the description that follows.

The heat insulating socket member 30 is comprised of a polyether ether ketone resin material (PEEK material: registered trademark of Victrex Corp.) that has a heat insulating property, electrical insulating property, durability against ultraviolet rays, and corrosion resistance. The heat insulating socket member 30 has predetermined flat surfaces at the front side and the back side and has a size corresponding to the lamp fixing plate 22. As shown in FIG. 7 and FIG. 8, the heat insulating socket member 30 has an evacuation tube entry portion 31, for entry of the evacuation tube portion 11d (see FIG. 2) of the deuterium lamp 10, stem pin entry portions 32a to 32i, for entry of the stem pins 19a to 19i (see FIG. 3) of the deuterium lamp 10, pin socket members 33a to 33e, inserted in the predetermined stem pin entry portions 32a, 32b, 32g, 32e, and 32c and electrically connected to the stem pins 19a, 19b, 19g, 19e, and 19c, positioning pins 34, protruding from the back side for positioning of the heat insulating socket member 30 with respect to the lamp fixing plate 22, and openings 35 for fixing the heat insulating socket member 30 by screws.

The evacuation tube entry portion 31 is an opening that is formed in a central portion of the heat-insulating socket member 30. The diameter of this opening increases from the back side to the front side.

The stem pin entry portions 32a to 32i are a plurality of openings formed along a predetermined circumference in a periphery of the evacuation tube entry portion 31. These openings are positioned in correspondence to the stem pins 19a to 19i (see FIG. 3). The stem pin entry portions 32a, 32b, 32g, 32e, and 32c, into which the pin socket members 33a to 33e enter, have a diameter of approximately 1.8 mm and the remaining stem pin entry portions 32d, 32i, 32h, and 32f have a diameter of approximately 1.3 mm. As shown in FIG. 10, the stem portion 11b has a glass bulging portion 11e at a periphery of each portion through which a stem pin 19 passes. As shown in FIG. 9, in order to fix the stem portion 11b and the heat insulating socket member 30 in close contact, the stem pin entry portions 32d, 32i, 32h, and 32f have a diameter that allows the entry of the bulging portions 11e.

The pin socket members 33a to 33e, which are inserted in and attached to the stem pin entry portions 32a, 32b, 32g, 32e, and 32c, have cylindrical shapes. As shown in FIG. 8, these pin socket members 33a to 33e protrude from the back side of the heat insulating socket member 30 and the closed rear ends thereof are connected to electrical cables. The stem pins 19a, 19b, 19g, 19e, and 19c are detachable with respect to the pin socket members 33a to 33e, and rear ends (right sides in the figure) of the stem pins 19a, 19b, 19g, 19e, and 19c are fixed (electrically connected) to the pin socket members 33a to 33e. As shown in FIG. 9, the mounting positions of the front ends of the pin socket members 33a to 33e are separated by a predetermined distance from a front surface of the heat insulating socket member 30. Specifically, the pin socket members 33a to 33e are separated so as not to contact the bulging portions 11e of the stem portion 11b.

As shown in FIG. 9, the deuterium lamp 10 is detachably fixed to the heat insulating socket member 30. Specifically, the evacuation tube portion 11d and the stem pins 19a to 19i of the deuterium lamp 10 respectively enter the evacuation tube entry portion 31 and the stem pin entry portions 32a to 32i of the heat insulating socket member 30, the stem portion 11b is put in plane contact with the front surface of the heat insulating socket member 30, and the stem pins 19a, 19b, 19g, 19e, and 19c are fitted into the pin socket members 33a to 33e. Here, the front portion of the heat-insulating socket member 30 that is in contact with the stem portion 11b becomes a plane contact portion 30a.

As shown in FIG. 8, the positioning pins 34 protrude outward from both sides of the evacuation tube entry portion 31 and fit into small holes 22b (see FIG. 6) of the lamp fixing plate 22. Also, as shown in FIG. 7 and FIG. 8, the openings 35 are respectively formed at positions corresponding to the female thread portions 22c (see FIG. 6) of the lamp fixing plate 22. By the positioning pins 34 being fitted into small holes 22b of the lamp fixing plate 22 and male screws being screwed into the female thread portions 22c via the openings 35, the heat insulating socket member 30 is positioned and fixed to the lamp fixing plate 22. The lamp fixing plate 22 can thus be detached with respect to the light emitting plate 23 and the bottom plate 21 with the deuterium lamp 10 being fixed as it is to the lamp fixing plate 22 via the heat insulating socket member 30.

Actions of the light source apparatus 1 arranged as described above shall now be described. At the deuterium lamp 10, first, an electric power of approximately 10 W is supplied from an external power supply for the cathode to the cathode portion 17 via the pin socket members 33a and 33b and the stem pins 19a and 19b in a period of approximately 20 seconds before discharge. By this supply of power, the coil that constitutes the cathode portion 17 is preheated. A voltage of approximately 160V is then applied across the cathode portion 17 and the anode portion 14 from an external main discharge power supply and via the stem pins 19c and 19d. By this voltage application, preparation for arc discharge is completed.

Thereafter, a predetermined voltage, for example, a voltage of approximately 350V is applied across the discharge path restricting portion 16 and the anode portion 14 from an external trigger power supply and via the stem pins 19e, 19c, and 19d. Discharge then occurs successively across the cathode portion 17 and the discharge path restricting portion 16 and across the cathode portion 17 and the anode portion 14, and a starting discharge occurs across the cathode portion 17 and the anode portion 14. When the starting discharge occurs, an arc discharge (main discharge) is maintained across the cathode portion 17 and the anode portion 14 and an arc ball is generated inside the recessed portion 16d of the discharge path restricting portion 16. Ultraviolet rays taken out from this arc ball are transmitted through the light emitting window 11c and emitted to the exterior as light of extremely high brightness. In the discharge process, sputtering products and vaporized matter issuing from the cathode portion 17 are prevented from becoming attached to the light emitting window 11c by the cathode side covering portion 18b.

The emitted light from the deuterium lamp 10 passes through the lens 26 and is emitted out of the lamp box 20. The emitted ultraviolet rays are synthesized with the emitted light from the halogen lamp 3.

Here, when exchange of the deuterium lamp 10 or other maintenance work becomes necessary due to long-term use, the male screws that fix the lamp fixing plate 22 and the top plate 25 are loosened once. By then moving the lamp fixing plate 22 and the top plate 25 upward, the lamp fixing plate 22 and the top plate 25 become removable from the bottom plate 21 and the light emitting plate 23. The deuterium lamp 10 is thereby removed, together with the lamp fixing plate 22, from the light source apparatus 1. Because in then removing the deuterium lamp 10 from the lamp fixing plate 22, there are no interfering members, such as the light emitting plate 23, etc., in the surroundings and the structure enables attachment and detachment of the deuterium lamp 10 with respect to the heat insulating socket member 30 to be performed readily, the exchange of the deuterium lamp 10 can be performed easily.

Also, in mounting the deuterium lamp 10, the stem portion 11b and the heat insulating socket member 30 are fixed in close contact simply by the stem pins 19a, 19b, 19g, 19e, and 19c of the deuterium lamp 10 being inserted in the pin socket members 33a to 33e of the heat insulating socket member 30. By the lamp fixing plate 22, to which the deuterium lamp 10 is fixed, and the top plate 25 then being mounted to the bottom plate 21 and the light emitting plate 23, mounting of high precision in regard to distances and optical axis between the lens 26, the beam splitter 4, and other optical system components and the deuterium lamp 10 is realized.

The light source apparatus 1, arranged as described above, is provided with the pin socket members 33a to 33e, into which the stem pins 19a, 19b, 19g, 19e, and 19c that protrude outward from the stem portion 11b are made to enter, and the insulating socket member 30, which has the pin socket members 33a to 33e. The insulating socket member 30 has a structure that detachably fixes the deuterium lamp 10 while being in plane contact with the stem portion 11b. Because the deuterium lamp 10 is thus fixed in close contact with the heat insulating socket member 30, the precision of positioning of the deuterium lamp 10 is improved dramatically. Also, because the stem portion 11b is fixed in close contact with the heat insulating socket member 30, the stability of fixing of the deuterium lamp 10 is increased in comparison to the conventional light source apparatus, in which fixing with respect to a base plate that fixes the deuterium lamp is achieved via stem pins (with there being a gap between the base plate and the stem portion).

Because the lamp fixing plate 22 has a structure that enables detachment from the light emitting plate 23 that opposes the lamp fixing plate 22 with the deuterium lamp 10 being fixed thereto, the deuterium lamp 10 can be removed together with the lamp fixing plate 22 and separated from the light emitting plate 23. As a result, interfering parts are eliminated from the surroundings, thus enabling the deuterium lamp 10 to be attached and detached with respect to the lamp fixing plate 22 readily and maintenance work of the deuterium lamp 10 to be performed readily. Also, because the deuterium lamp 10 has a structure that enables attachment and detachment with respect to the heat insulating socket member 30, the removal of the deuterium lamp 10 is easy. The exchange of the deuterium lamp 10 and other maintenance work are facilitated from this aspect as well.

In the lamp box 20, the pair of side surface plates 24 have a structure that enables attachment and detachment with respect to the lamp fixing plate 22 and the top plate 25. Thus, when the deuterium lamp 10 is removed with it being fixed to the lamp fixing plate 22, the exchange of the deuterium lamp 10 and other maintenance work can be performed even more readily. Each of the side surface plates 24 is fixed to the top plate 25 by inserting the positioning pin 23c and the male screws through the openings 24c and 24d formed in the upper end plate 24a. Meanwhile, the top plate 25 and the lamp fixing plate 22 are fixed to the light emitting plate 23 and the bottom plate 21 by the male screws and the positioning pins 23c being respectively inserted through the opening 25a, the positioning holes 25b, and the opening 22e that are formed in the upper surfaces of the top plate 25 and the extending portion 22d. The pair of side surface plates 24, the lamp fixing plate 22, and the top plate 25 can thus be attached and detached by just working from the upper side of the lamp box 20, and the exchange of the deuterium lamp 10 and other maintenance work can thus be performed even more readily. Such a structure is especially effective in cases where the installation space of the lamp box 20 is extremely narrow.

The light emitting plate 23 has a structure that holds the lens 26 that transmits the light from the deuterium lamp 10. The deuterium lamp 10 can thus be positioned readily with respect to the lens 26.

The heat insulating socket member 30 has a plate shape. The heat insulating socket member 30 is thus made to be fixed in close contact to the lamp fixing plate 22 readily.

The deuterium lamp 10 is fixed inside the lamp box 20, and the heat insulating socket member 30 is disposed between the deuterium lamp 10 and the lamp fixing plate 22. Thus, in comparison to the conventional light source apparatus, in which the heat insulating member is disposed outside the lamp box, and the deuterium lamp and the lamp box are in contact, heat transfer between the lamp box 20 and the deuterium lamp 10 is reduced. Consequently, the influence of temperature change, outside the lamp box 20, on the deuterium lamp 10 is reduced effectively and stabilization of the brightness of the deuterium lamp 10 can be realized.

With the deuterium lamp 10 having the above-described structure, the cathode portion 17 is surrounded by the cathode side covering portion 18b of the cathode portion cover 18 that is comprised of ceramic of excellent heat insulating property (only the slit 18d for electron emission is formed as the minimum necessary opening in the cathode side covering portion 18b). The effect of heat insulation of the cathode portion 17 is significantly improved by the cathode side covering portion 18b. As a result of temperature maintenance of the cathode potion 7 thus being made simple and the consumption power being lowered, the gas discharge tube 10, including its power supply, can be made compact.

The cathode portion cover 18 is formed integrally of ceramic so that while the cathode side covering portion 18b covers the cathode portion 17 in a state enabling electron emission, the anode side covering portion 18a covers the assembly, which includes the anode portion 14 and the discharge path restricting portion 16, in a manner enabling discharge. By this structure, the need to expose the discharge path restricting portion 16 more than necessary is eliminated and consequently, a member (a separate member that corresponds to an upper portion of the anode side covering portion 18a in the present embodiment) for improving the discharge efficiency is made unnecessary. The number of parts is thus reduced and cost reduction is achieved.

The discharge path restricting portion 16 is fixed in a state of being sandwiched by the upper wall portion of the anode side covering portion 18a, which is the portion of the cathode portion cover 18 that covers the above-described assembly, and the discharge path restricting portion fixing plate 15, provided with the opening 15x, through which the discharge path passes. The discharge path restricting portion 16 can thus be fixed readily with a small number of parts, and further cost reduction is enabled.

Figure 11:
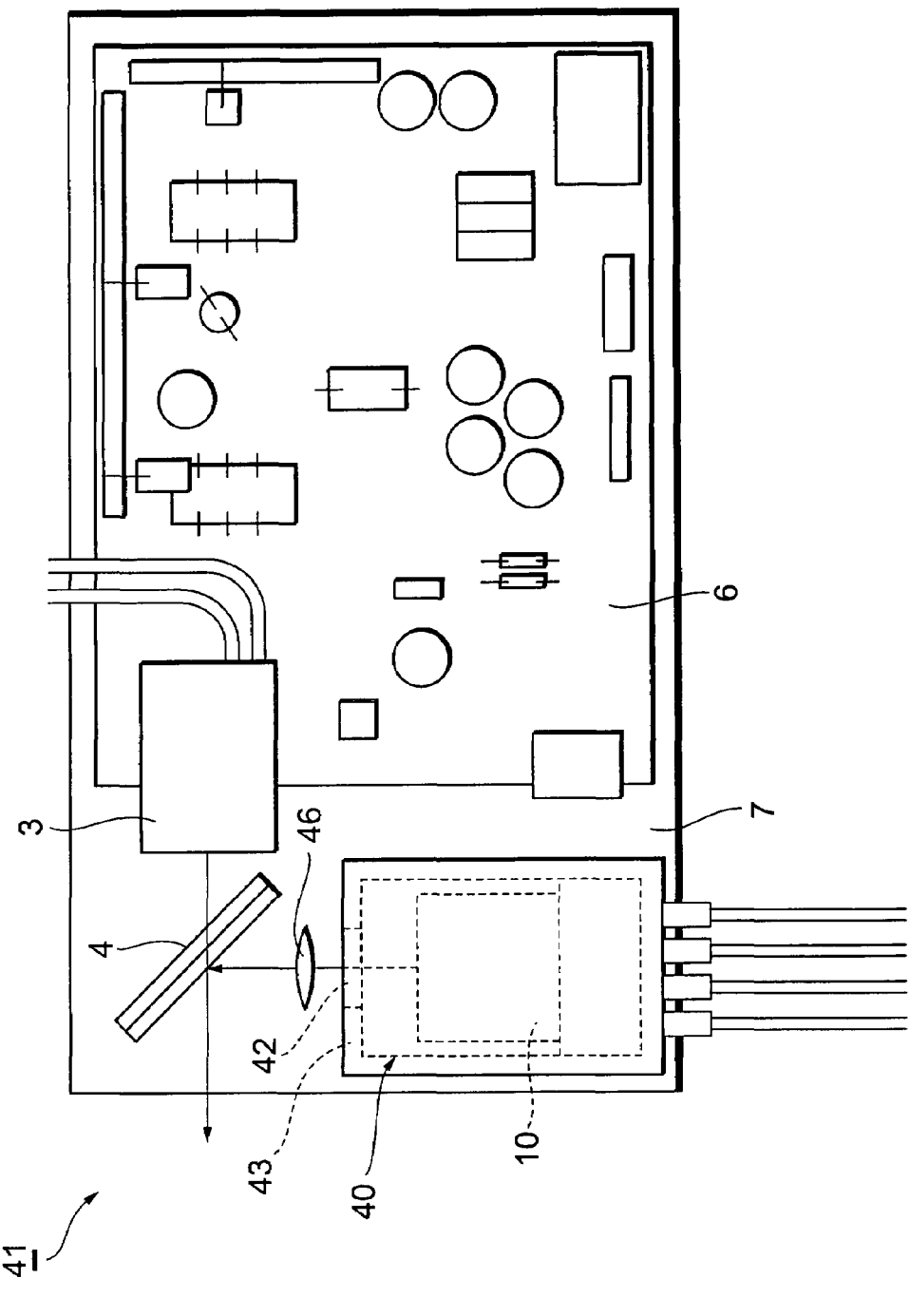
FIG. 11 is a diagram of a general arrangement of a second embodiment of a light source apparatus according to the present invention.

A second embodiment of a light source apparatus according to the present invention shall now be described with reference to FIG. 11. FIG. 11 is a diagram of a general arrangement of the second embodiment of a light source apparatus according to the present invention.

The points of difference of a light source apparatus 41 according to the second embodiment with respect to the light source apparatus 1 according to the first embodiment are that in place of the lamp box 20 that is provided with the light emitting plate 23 having the lens 26, a lamp box 40, having a light emitting plate 43 with a light emitting window 42, is provided and a lens 46 is fixed to the base 7 so that the lens 46 is positioned between the light emitting plate 43 and the beam splitter 4. The arrangement of the rest of the light source apparatus 41 according to the second embodiment is the same as that of the light source apparatus 1 according to the first embodiment, and even with this arrangement, the same actions and effects as the light source apparatus 1 according to the first embodiment are exhibited.

Figure 12:
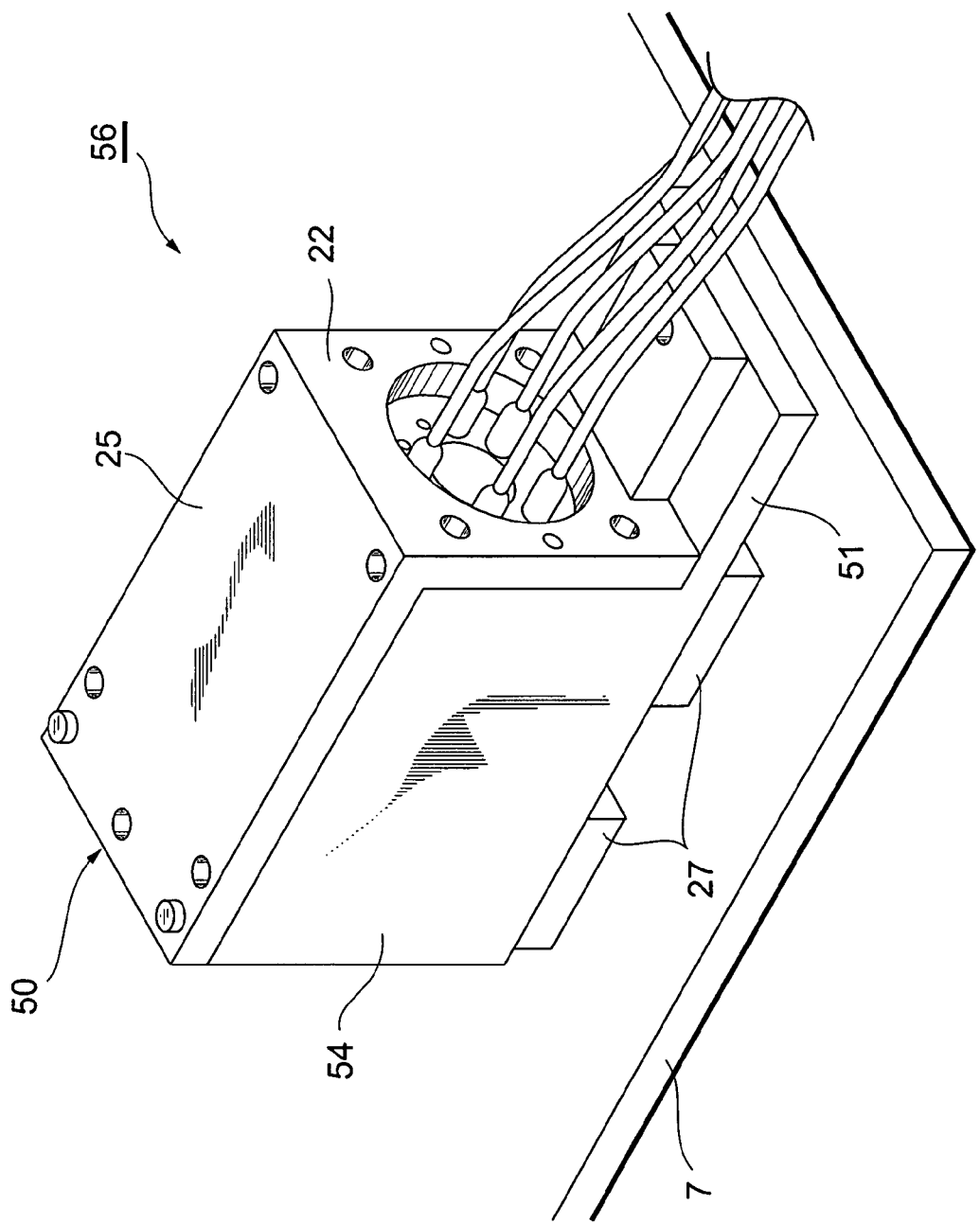
FIG. 12 is a perspective view of a structure of a lamp box of a third embodiment of a light source apparatus according to the present invention.
Figure 13:
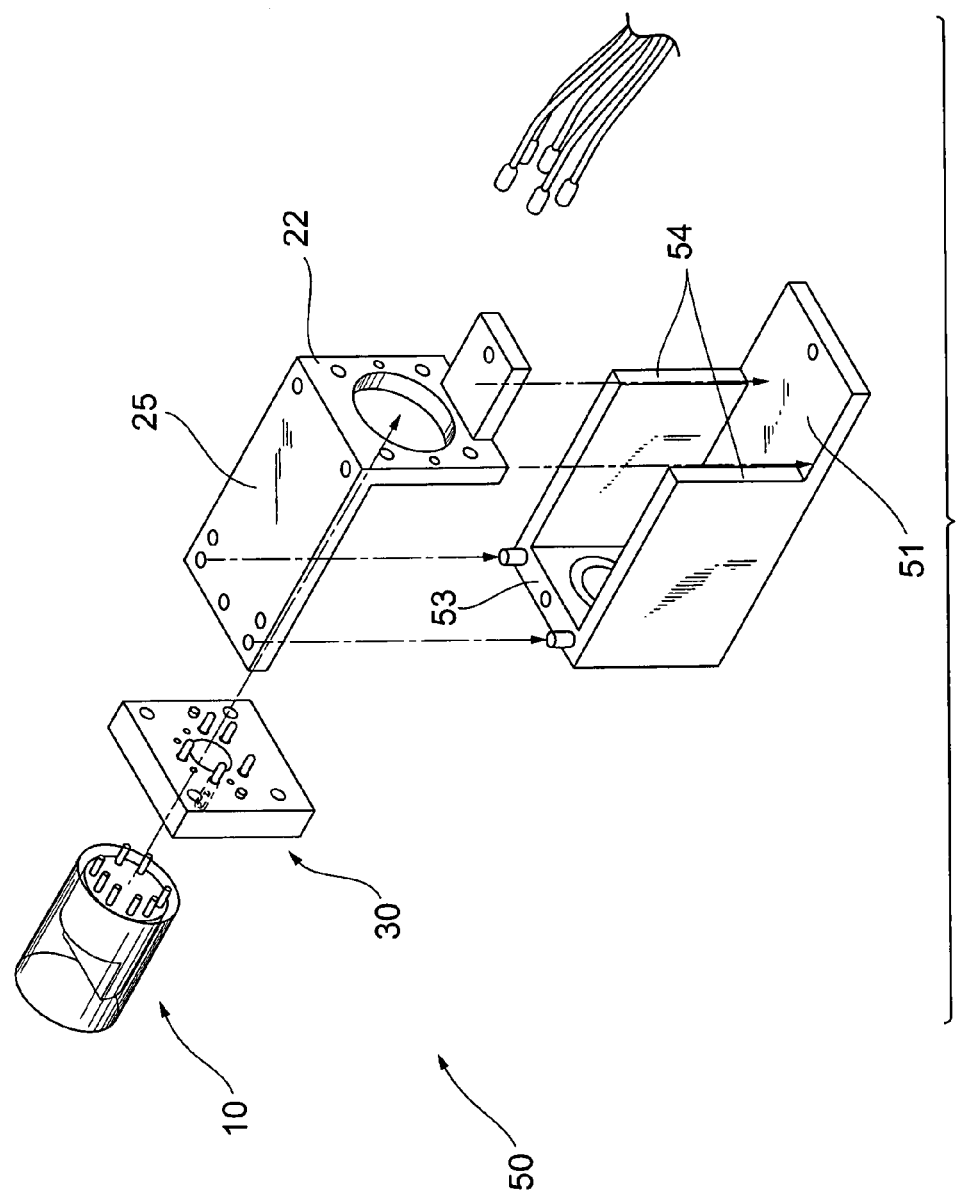
FIG. 13 is an exploded perspective view of an internal state of the lamp box (internal state in which the deuterium lamp is housed) of FIG. 12.

A third embodiment of a light source apparatus according to the present invention shall now be described with reference to FIG. 12 and FIG. 13. FIG. 12 is a perspective view of a structure of a lamp box of the third embodiment of a light source apparatus according to the present invention. FIG. 13 is an exploded perspective view of an internal state of the lamp box (internal state in which the deuterium lamp is housed) of FIG. 12.

A point of difference of a light source apparatus 56 according to the third embodiment with respect to the light source apparatus 1 according to the first embodiment is that in place of the lamp box 20, with which the side surface plates 24, the bottom plate 51, and the light emitting plate 53 are arranged as separate members, a lamp box 50, with which side surface plates 54, a bottom plate 51, and a light emitting plate 53 constitute an integral member, is applied and the plate spring 28 that urges the side surface plates is thereby made unnecessary. Specifically, the bottom plate 51 and the light emitting plate 53 have the same structures as the bottom plate 21 and the light emitting plate 23 in the first embodiment. However, the side surface plates 54 are erected upward from ends in the width direction of the bottom plate 51. The side surface plates 54 thus form wall surfaces that are orthogonal to the bottom plate 51 and the light emitting plate 53 and extend to the same height as the light emitting plate 53. The arrangement of the rest of the light source apparatus 56 according to the third embodiment is the same as that of the light source apparatus 1 according to the first embodiment, and even with this structure, the same actions and effects as the light source apparatus 1 according to the first embodiment are exhibited. In addition, because the plate spring 28 is made unnecessary, the number of parts is reduced even more than in the first embodiment.

Figure 14:
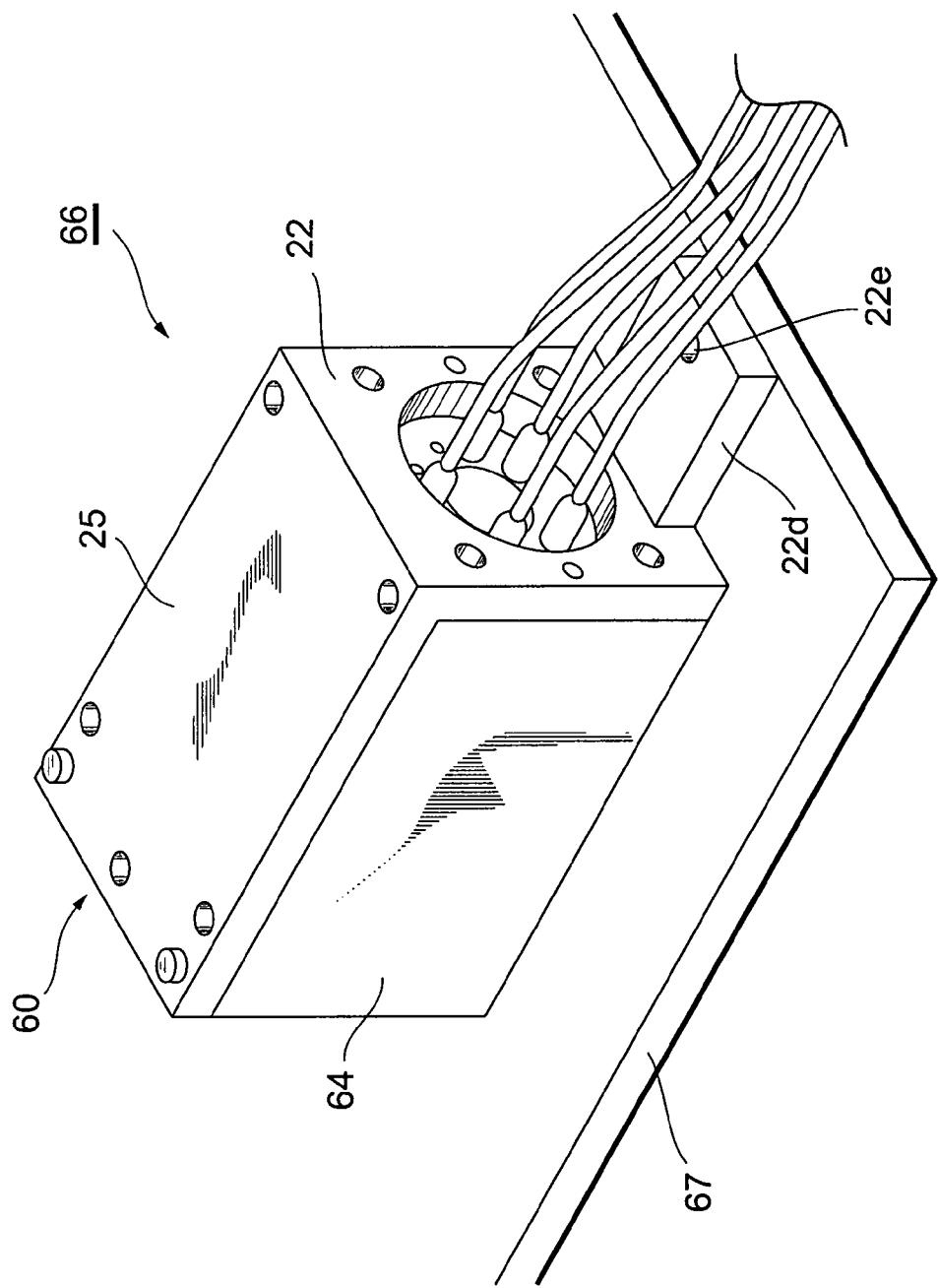
FIG. 14 is a perspective view of a structure of a lamp box of a fourth embodiment of a light source apparatus according to the present invention.
Figure 15:
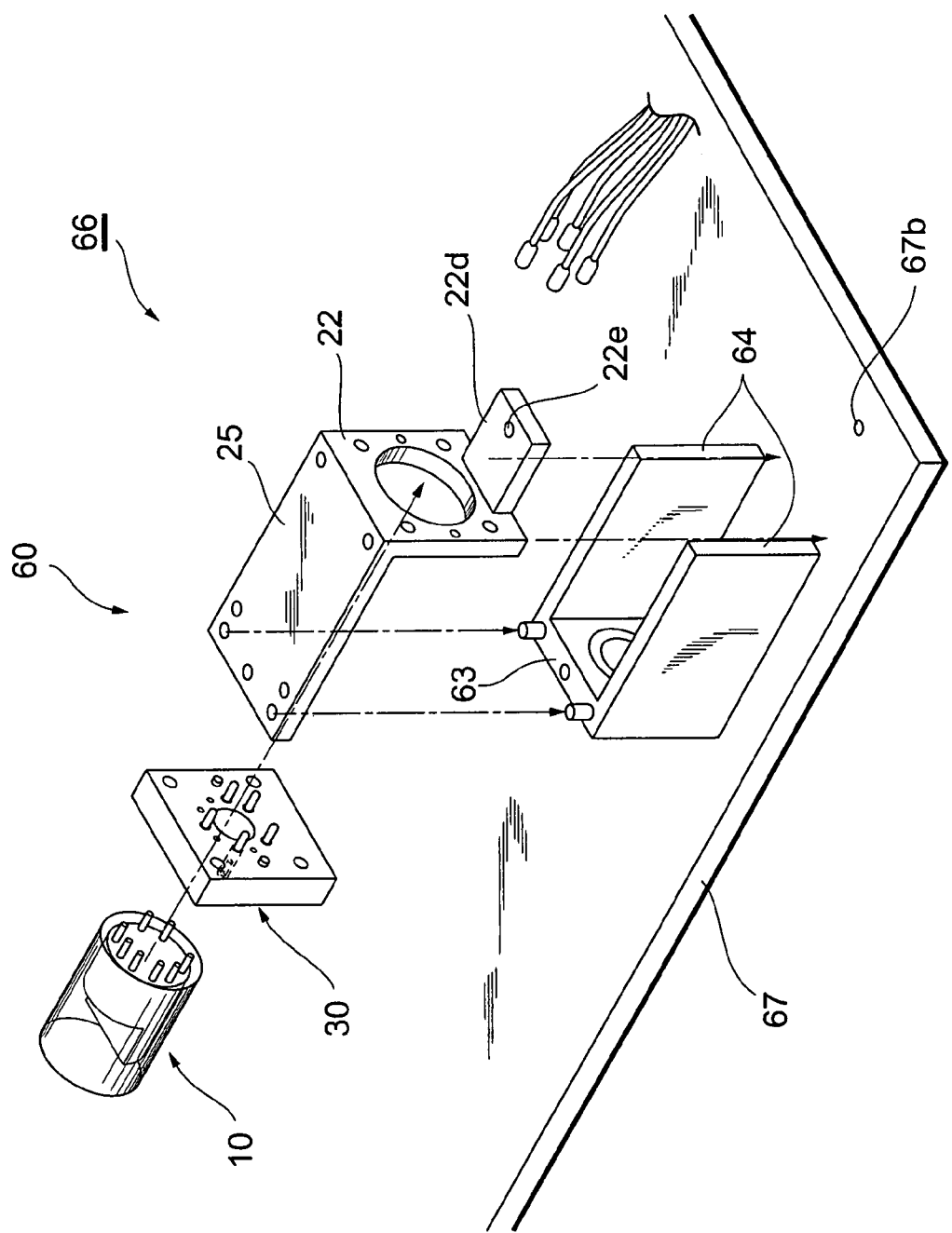
FIG. 15 is an exploded perspective view of an internal state of the lamp box (internal state in which the deuterium lamp is housed) of FIG. 14.

A fourth embodiment of a light source apparatus according to the present invention shall now be described with reference to FIG. 14 and FIG. 15. FIG. 14 is a perspective view of a structure of a lamp box of the fourth embodiment of a light source apparatus according to the present invention. FIG. 15 is an exploded perspective view of an internal state of the lamp box (internal state in which the deuterium lamp is housed) of FIG. 14.

A point of difference of a light source apparatus 66 according to the fourth embodiment with respect to the light source apparatus 56 according to the third embodiment is that in place of the lamp box 50, with which the side surface plates 54, the bottom plate 51, and the light emitting plate 53 constitute an integral member, a lamp box 60 is applied with which the light emitting plate 63 and the side surface plates 64 constitute an integral member and a base 67 serves in common as the bottom plate. Whereas the light emitting plate 63 and the side surface plates 64 have the same structure as the light emitting plate 53 and the side surface plates 54 of the third embodiment, the heat insulating materials 27, positioned on the bottom plate 51, are lacking. The base 67 has the same structure as the base 7, and a female thread portion 67b for fixing the lamp fixing plate 22 is formed at a position corresponding to the opening 22e of the extending portion 22d of the lamp fixing plate 22. The arrangement of the rest of the light source apparatus 66 according to the fourth embodiment is the same as that of the light source apparatus 1 according to the first embodiment, and even with this structure, the same actions and effects as the light source apparatus 1 according to the first embodiment are exhibited. In addition, because the base 67 serves in common as the bottom plate of the lamp box 60, the number of parts is reduced further.

Figure 16:
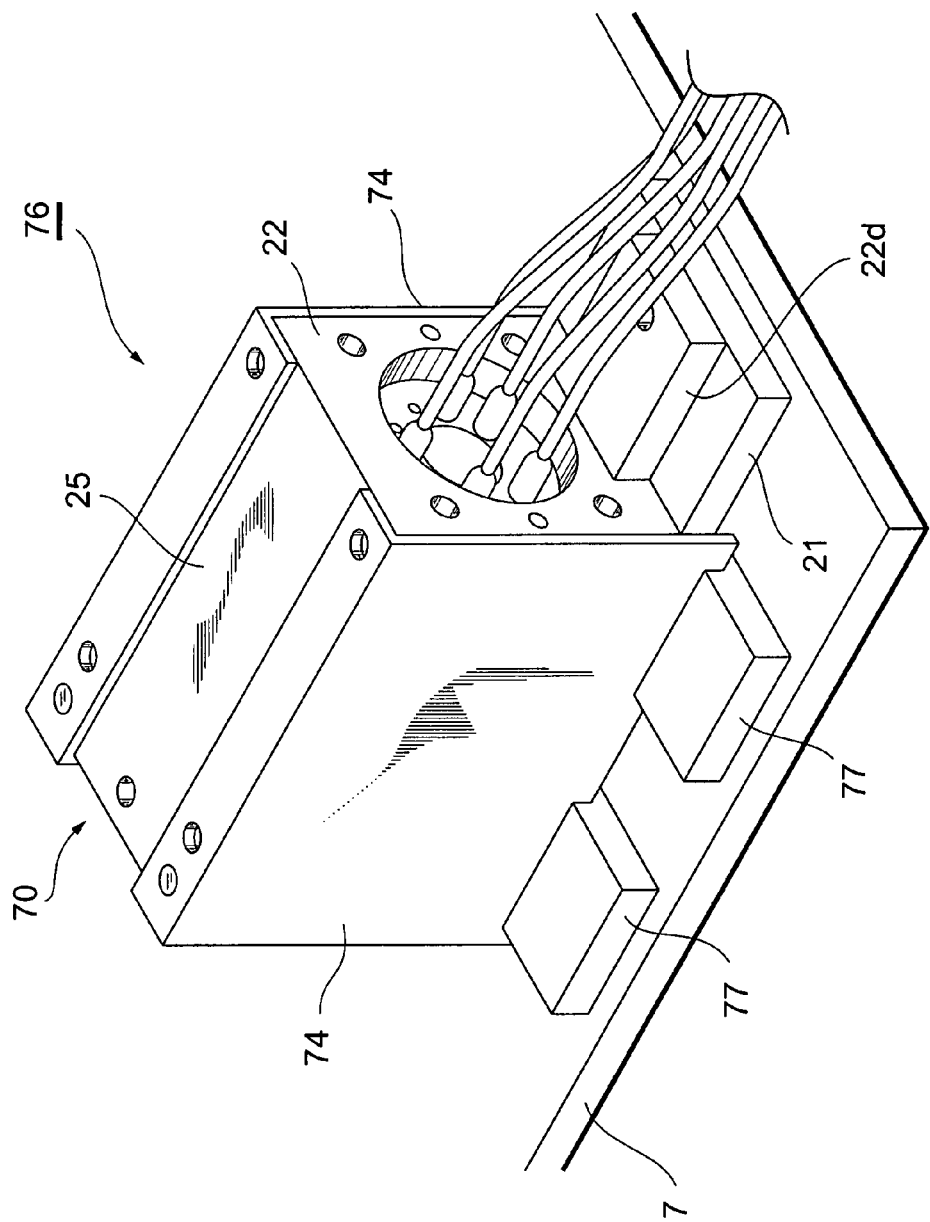
FIG. 16 is a perspective view of a structure of a lamp box of a fifth embodiment of a light source apparatus according to the present invention.
Figure 17:
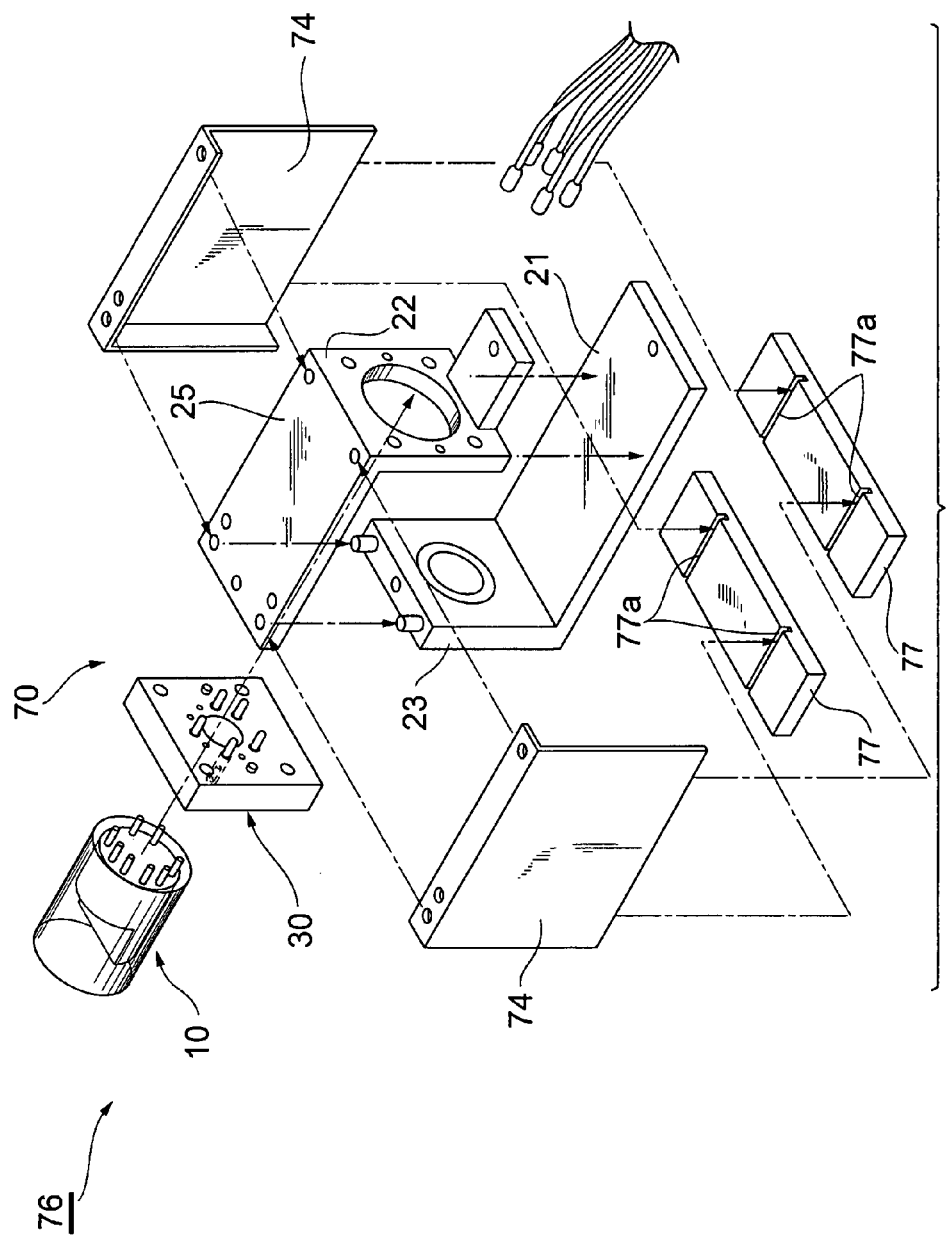
FIG. 17 is an exploded perspective view of an internal state of the lamp box (internal state in which the deuterium lamp is housed) of FIG. 16.

A fifth embodiment of a light source apparatus according to the present invention shall now be described with reference to FIG. 16 and FIG. 17. FIG. 16 is a perspective view of a structure of a lamp box of the fifth embodiment of a light source apparatus according to the present invention. FIG. 17 is an exploded perspective view of an internal state of the lamp box (internal state in which the deuterium lamp is housed) of FIG. 16.

A point of difference of a light source apparatus 76 according to the fifth embodiment with respect to the light source apparatus 1 according to the first embodiment is that in place of the heat insulating materials 27, heat insulating materials 77, having grooves 77a, are applied and the plate spring 28 is made unnecessary. In comparison to the side surface plates 24 of the first embodiment, side surface plates 74 are longer in the vertical direction by amounts corresponding to the portions that fit into the grooves 77a and the lower ends protrude below the bottom plate 21. A lamp box 70, with which the lower ends of the side surface plates 74 are erected in the grooves 77a of the heat insulating materials 77, is thus obtained. The arrangement of the rest of the light source apparatus 76 according to the fifth embodiment is the same as that of the light source apparatus 1 according to the first embodiment, and even with this structure, the same actions and effects as the light source apparatus 1 according to the first embodiment are exhibited. In addition, because the plate spring 28 is made unnecessary, the number of parts is reduced further.

Figure 18:
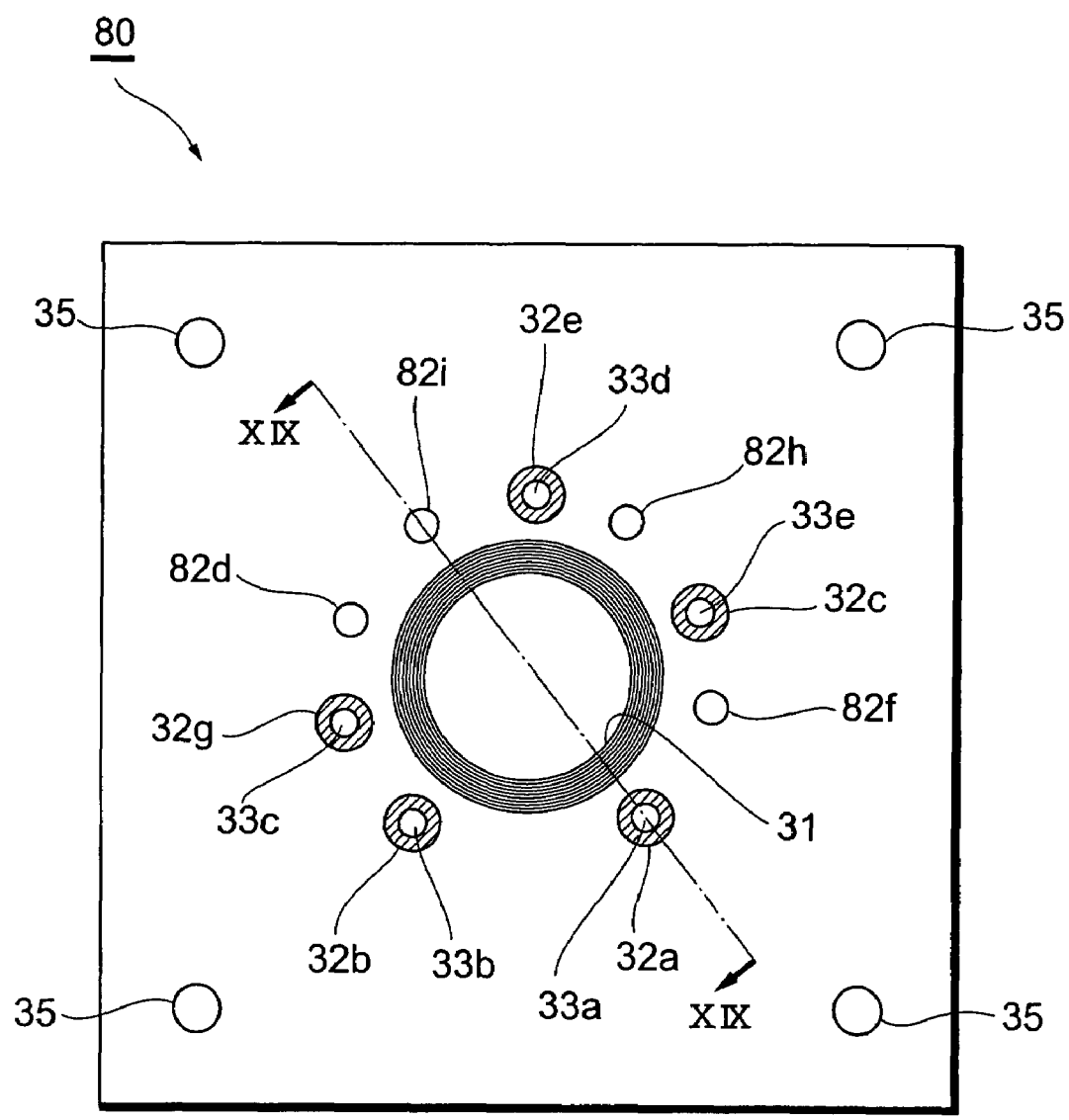
FIG. 18 is a front view of a structure of a heat insulating socket member in a sixth embodiment of a light source apparatus according to the present invention.
Figure 19:
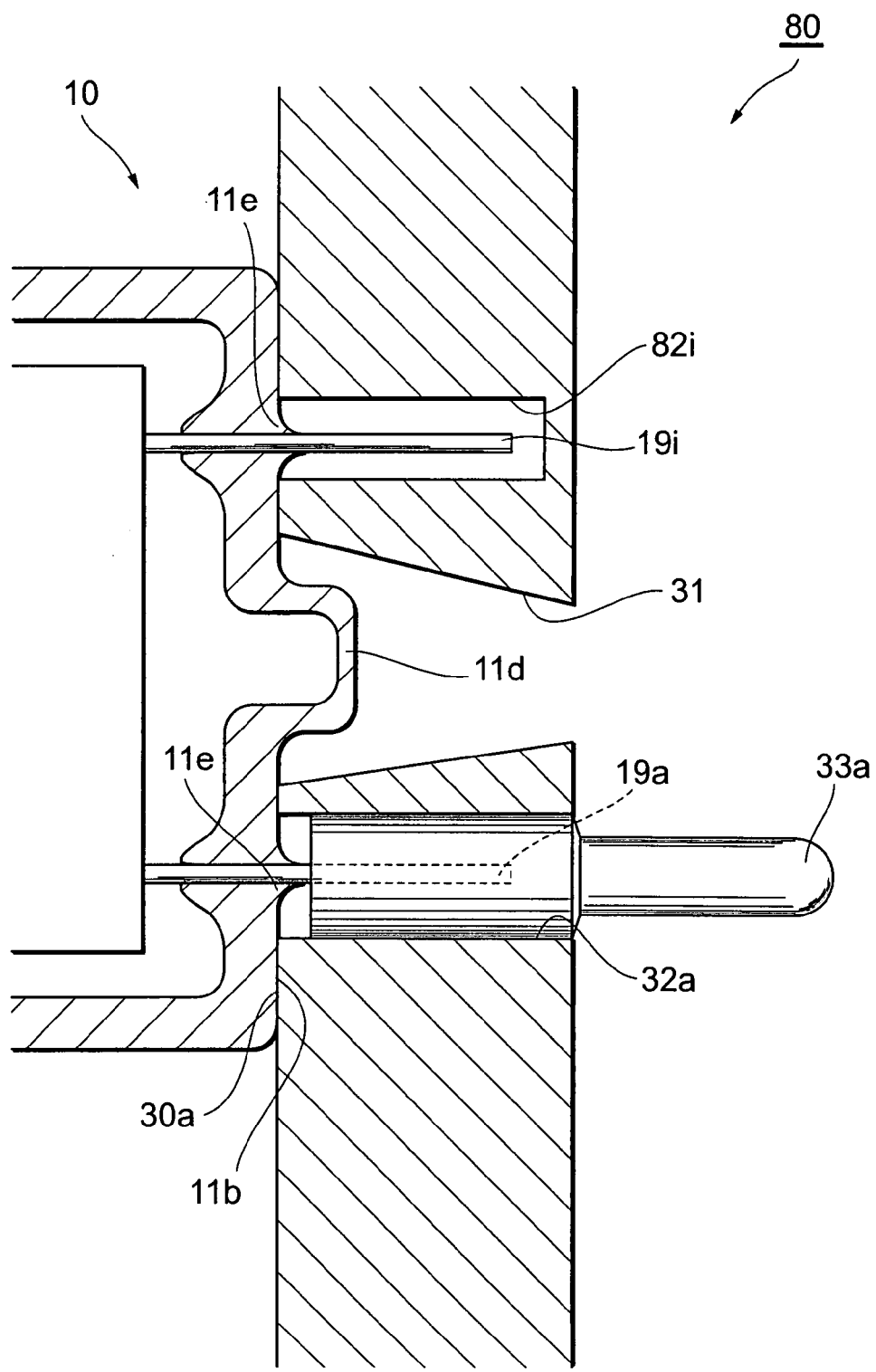
FIG. 19 is a diagram of a sectional structure along line XIX-XIX of the heat insulating socket (FIG. 18) in the state in which the deuterium lamp is fixed.

A sixth embodiment of a light source apparatus according to the present invention shall now be described with reference to FIG. 18 and FIG. 19. FIG. 18 is a front view of a structure of a heat insulating socket member in the sixth embodiment of a light source apparatus according to the present invention. FIG. 19 is a diagram of a sectional structure along line XIX-XIX of the heat insulating socket (FIG. 18) in the state in which the deuterium lamp is fixed.

A point of difference of a light source apparatus according to the sixth embodiment with respect to the light source apparatus according to the first embodiment is that in place of the heat insulating socket member 30, provided with the stem pin entry portions 32d, 32i, 32h, and 32f, which are openings, the heat insulating socket member 80, provided with stem pin entry portions 82d, 82i, 82h, and 82f, which are recessed portions that are closed at the back side, is applied. The arrangement of the rest of the light source apparatus according to the sixth embodiment is the same as that of the light source apparatus 1 according to the first embodiment, and even with this structure, the same actions and effects as the light source apparatus 1 according to the first embodiment are exhibited. In addition, because the back sides of the stem pin entry portions 82d, 82i, 82h, and 82f are closed by the heat insulating member 80, the influence of temperature change, outside the lamp box 20, on the deuterium lamp 10 is reduced further.

Figure 20:
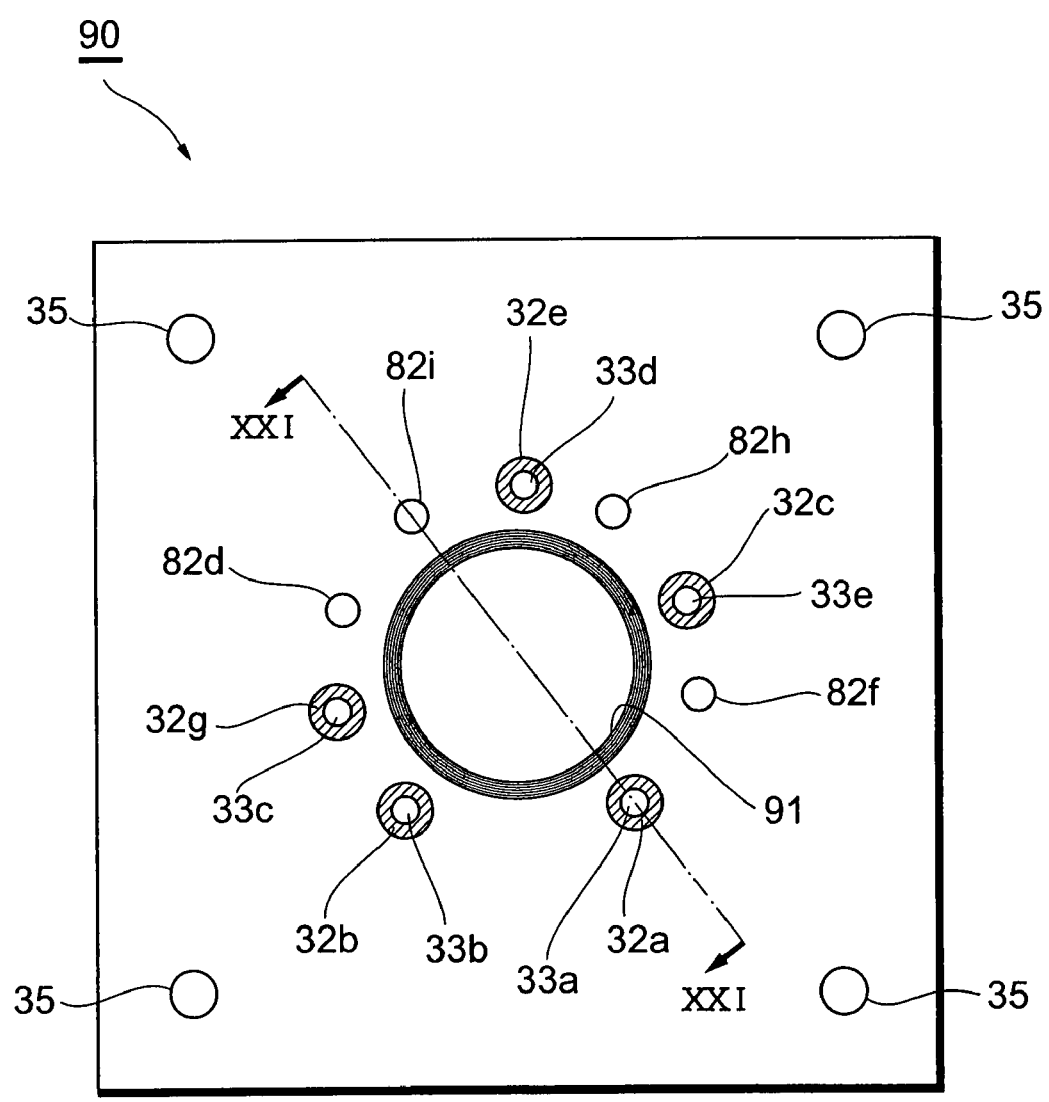
FIG. 20 is a front view of a structure of a heat insulating socket member in a seventh embodiment of a light source apparatus according to the present invention.
Figure 21:
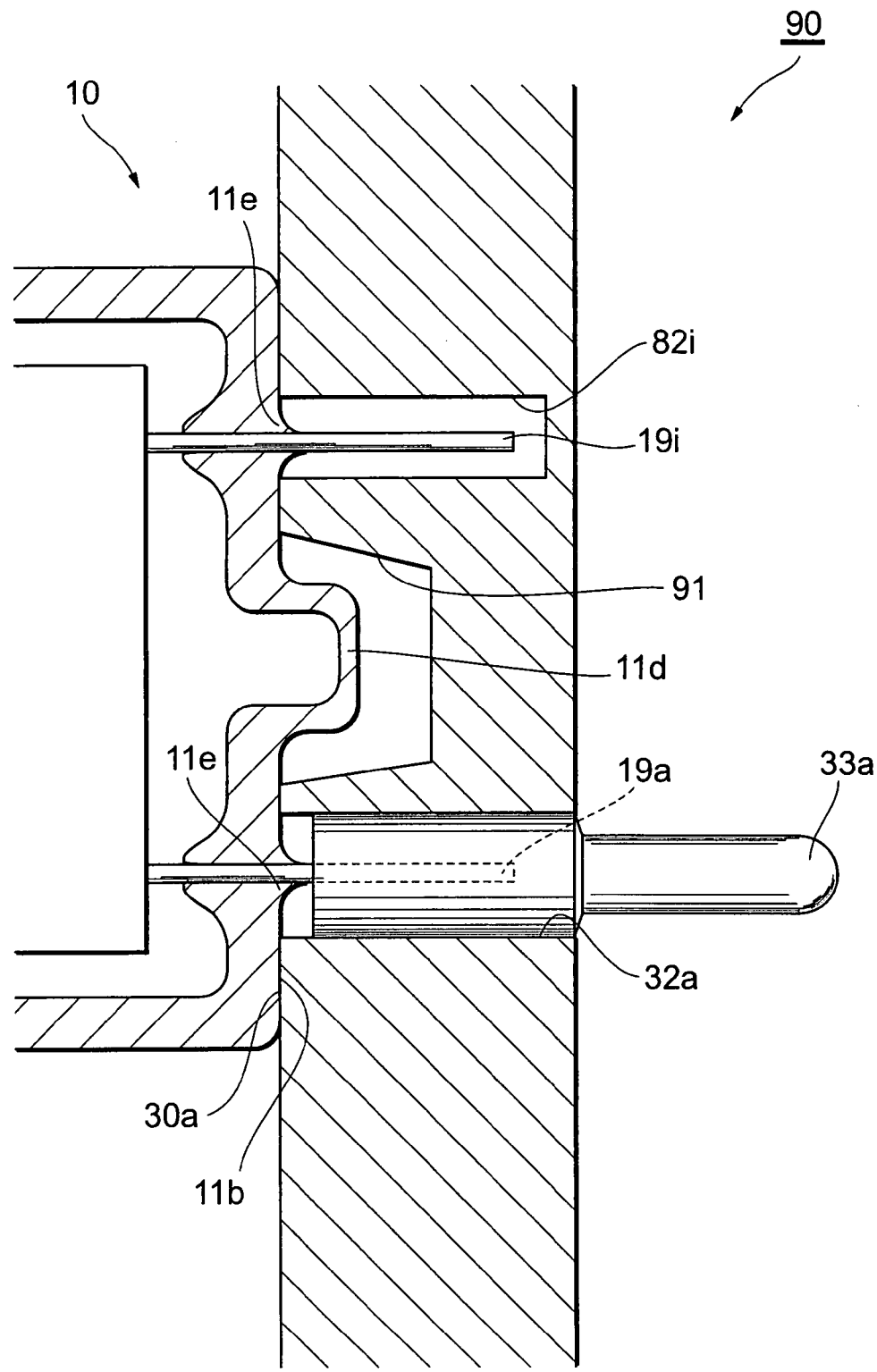
FIG. 21 is a diagram of a sectional structure along line XXI-XXI of the heat insulating socket (FIG. 20) in the state in which the deuterium lamp is fixed.

A seventh embodiment of a light source apparatus according to the present invention shall now be described with reference to FIG. 20 and FIG. 21. FIG. 20 is a front view of a structure of a heat insulating socket member in the seventh embodiment of a light source apparatus according to the present invention. FIG. 21 is a diagram of a sectional structure along line XXI-XXI of the heat insulating socket (FIG. 20) in the state in which the deuterium lamp is fixed.

A point of difference of a light source apparatus according to the seventh embodiment with respect to the light source apparatus according to the sixth embodiment is that in place of the heat insulating socket member 80, provided with the evacuation tube entry portion 31, which is an opening, the heat insulating socket member 90, provided with an evacuation tube entry portion 91, which is a recessed portion that is closed at the back side, is applied. The arrangement of the rest of the light source apparatus according to the seventh embodiment is the same as that of the light source apparatus 1 according to the first embodiment, and even with this structure, the same actions and effects as the light source apparatus 1 according to the first embodiment and the light source apparatus according to the sixth embodiment are exhibited. In addition, because the back side of the evacuation tube entry portion 91 is closed by the heat insulating member 90, the influence of temperature change, outside the lamp box 20, on the deuterium lamp 10 is reduced further.

Figure 22:
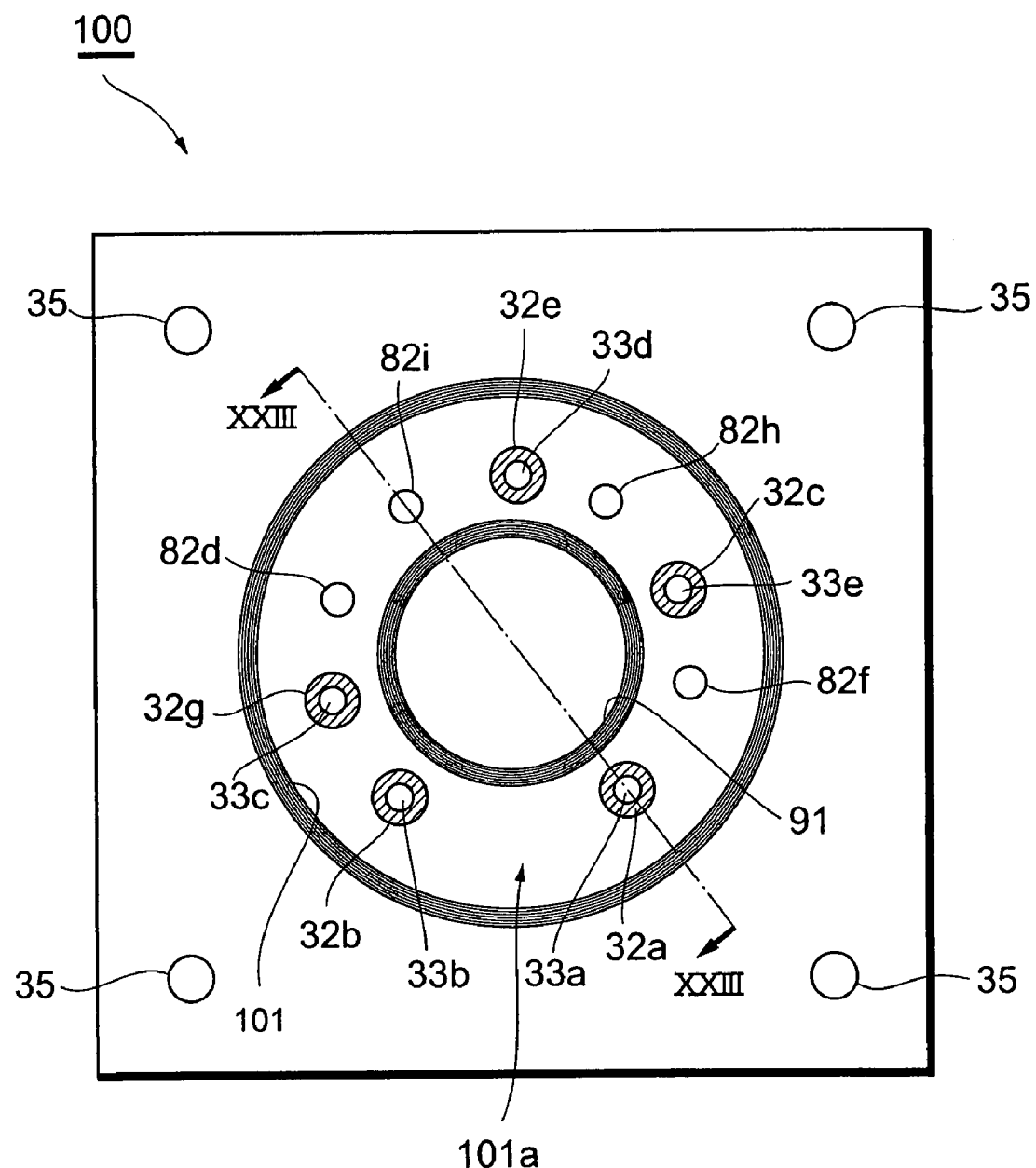
FIG. 22 is a front view of a structure of a heat insulating socket member in an eighth embodiment of a light source apparatus according to the present invention.
Figure 23:
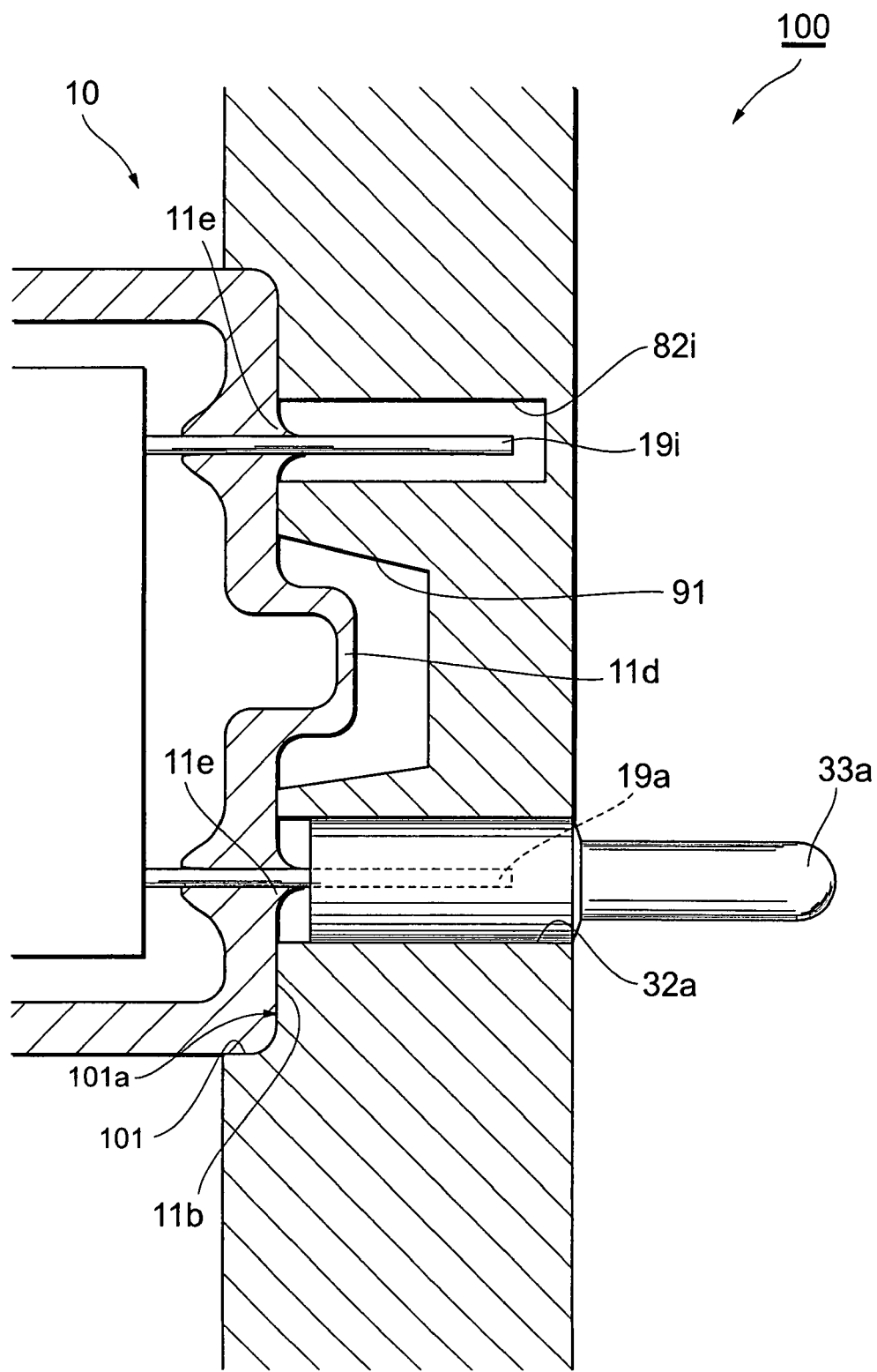
FIG. 23 is a diagram of a sectional structure along line XXIII-XXIII of the heat insulating socket (FIG. 22) in the state in which the deuterium lamp is fixed.

An eighth embodiment of a light source apparatus according to the present invention shall now be described with reference to FIG. 22 and FIG. 23. FIG. 22 is a front view of a structure of a heat insulating socket member in the eighth embodiment of a light source apparatus according to the present invention. FIG. 23 is a diagram of a sectional structure along line XXIII-XXIII of the heat insulating socket (FIG. 22) in the state in which the deuterium lamp is fixed.

A point of difference of a light source apparatus according to the eighth embodiment with respect to the light source apparatus according to the seventh embodiment is that the heat insulating socket member 100 has a first recessed portion 101 that houses the stem portion 11$b$ of the deuterium lamp 10. The shape of the first recessed portion 101 in front view is circular, and the outer diameter thereof is of a size corresponding to the outer diameter of the stem portion 11$b$. A bottom surface 101$a$ of the first recessed portion 101 is a flat surface. With the deuterium lamp 10, the evacuation tube portion 11$d$ and the stem pins 19$a$ to 19$i$ enter inside the evacuation tube entry portion 91 and the stem pin entry portions 32$a$, 32$b$, 32$c$, 82$d$, 32$e$, 82$f$, 32$g$, 82$h$, and 82$i$, respectively, with the stem portion 11$b$ being housed in the first recessed portion 101 as shown in FIG. 23. The stem portion 11$b$ is thereby detachably fixed while being in plane contact with the bottom surface (plane contacting portion) 101$a$ of the first recessed portion. The arrangement of the rest of the light source apparatus according to the eighth embodiment is the same as that of the light source apparatus 1 according to the first embodiment, and even with this structure, the same actions and effects as the light source apparatus 1 according to the first embodiment and the light source apparatus according to the seventh embodiment are exhibited. In addition, the stability upon fixing of the deuterium lamp 10 is improved.

Figure 24:
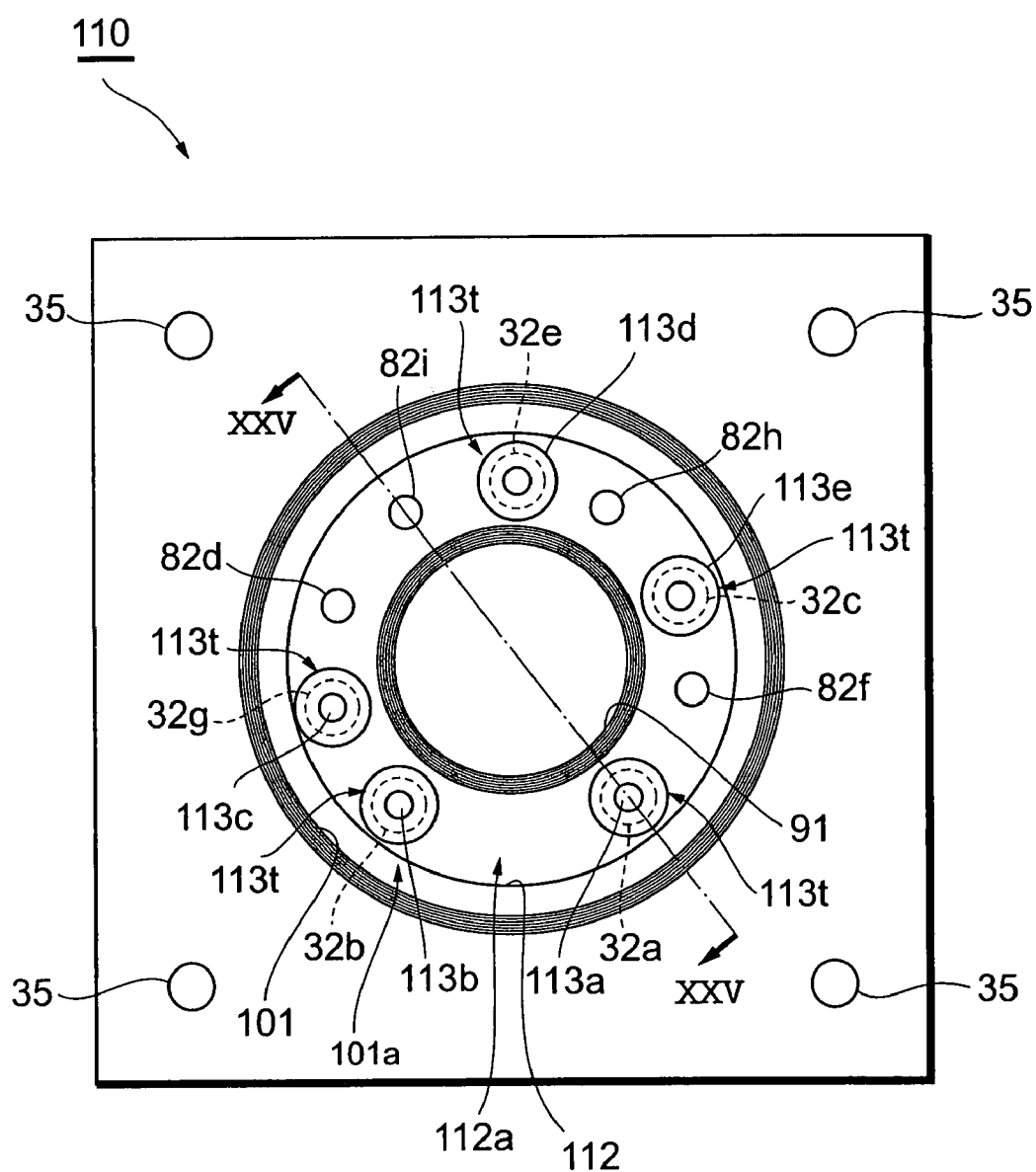
FIG. 24 is a front view of a structure of a heat insulating socket member in a ninth embodiment of a light source apparatus according to the present invention.
Figure 25:
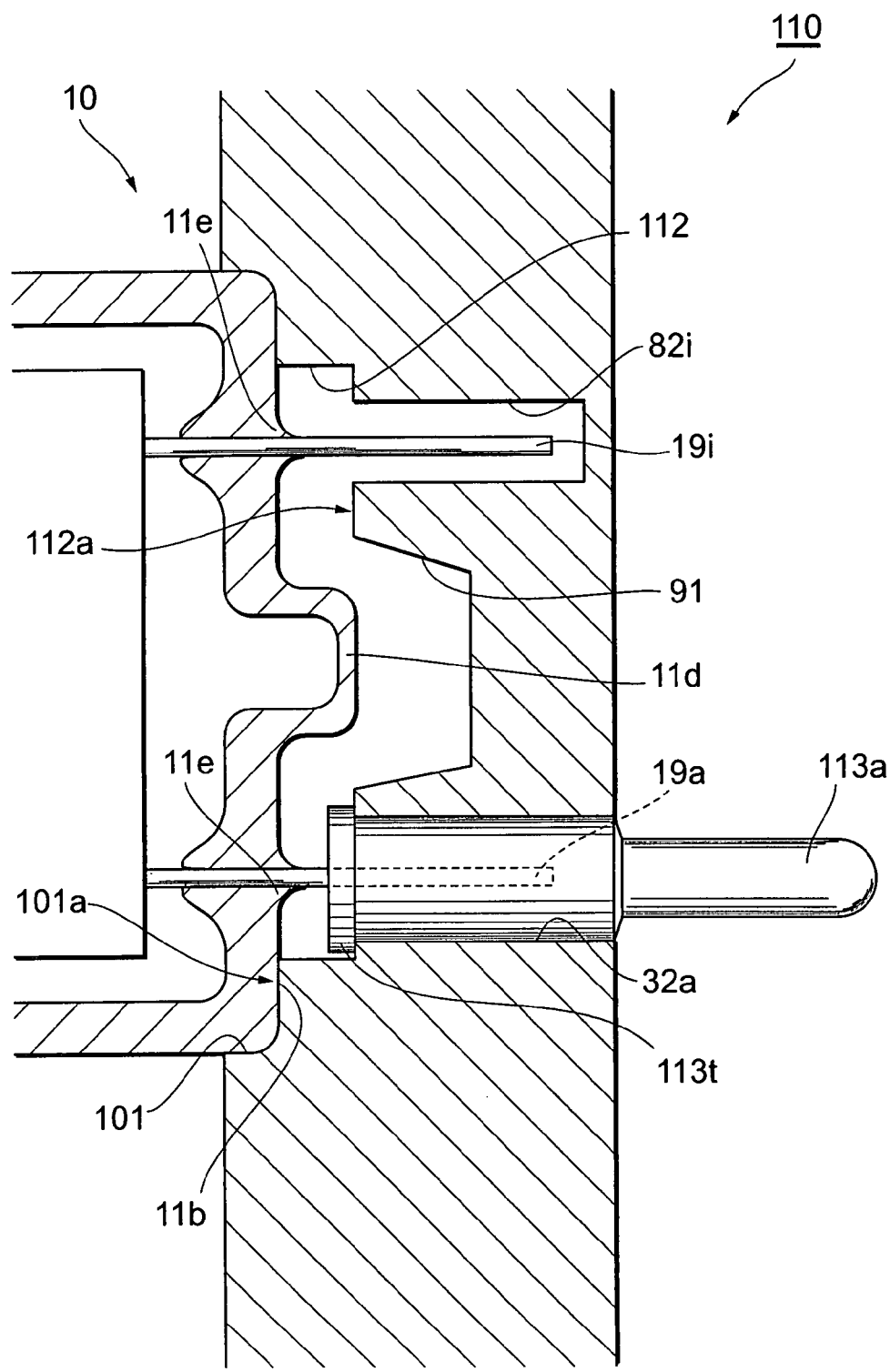
FIG. 25 is a diagram of a sectional structure along line XXV-XXV of the heat insulating socket (FIG. 24) in the state in which the deuterium lamp is fixed.

A ninth embodiment of a light source apparatus according to the present invention shall now be described with reference to FIG. 24 and FIG. 25. FIG. 24 is a front view of a structure of a heat insulating socket member in the ninth embodiment of a light source apparatus according to the present invention. FIG. 25 is a diagram of a sectional structure along line XXV-XXV of the heat insulating socket (FIG. 24) in the state in which the deuterium lamp is fixed.

Points of difference of a light source apparatus according to the ninth embodiment with respect to the light source apparatus according to the eighth embodiment are that the heat insulating socket member 110 has a second recessed portion 112 at the bottom surface 101$a$ of the first recessed portion 101 and that pin socket members 113$a$ to 113$e$, provided with collar portions 113$t$ that become latched onto circumferential edge portions at the front sides of the stem pin entry portions 32$a$, 32$b$, 32$g$, 32$e$, and 32$c$, are provided. The shape of the second recessed portion 112 in front view is circular and the outer circumference thereof is positioned at the outer sides of the stem pin entry portions 32$a$, 32$b$, 32$c$, 82$d$, 32$e$, 82$f$, 32$g$, 82$h$, and 82$i$. The pin socket members 113$a$ to 113$e$ are inserted into the stem pin entry portions 32$a$, 32$b$, 32$g$, 32$e$, and 32$c$ and the collar portions 113$t$ are latched to a bottom surface 112$a$ of the second recessed portion 112. The arrangement of the rest of the light source apparatus according to the ninth embodiment is the same as that of the light source apparatus 1 according to the first embodiment, and even with this structure, the same actions and effects as the light source apparatus 1 according to the first embodiment and the light source apparatus according to the eighth embodiment are exhibited.

Figure 26:
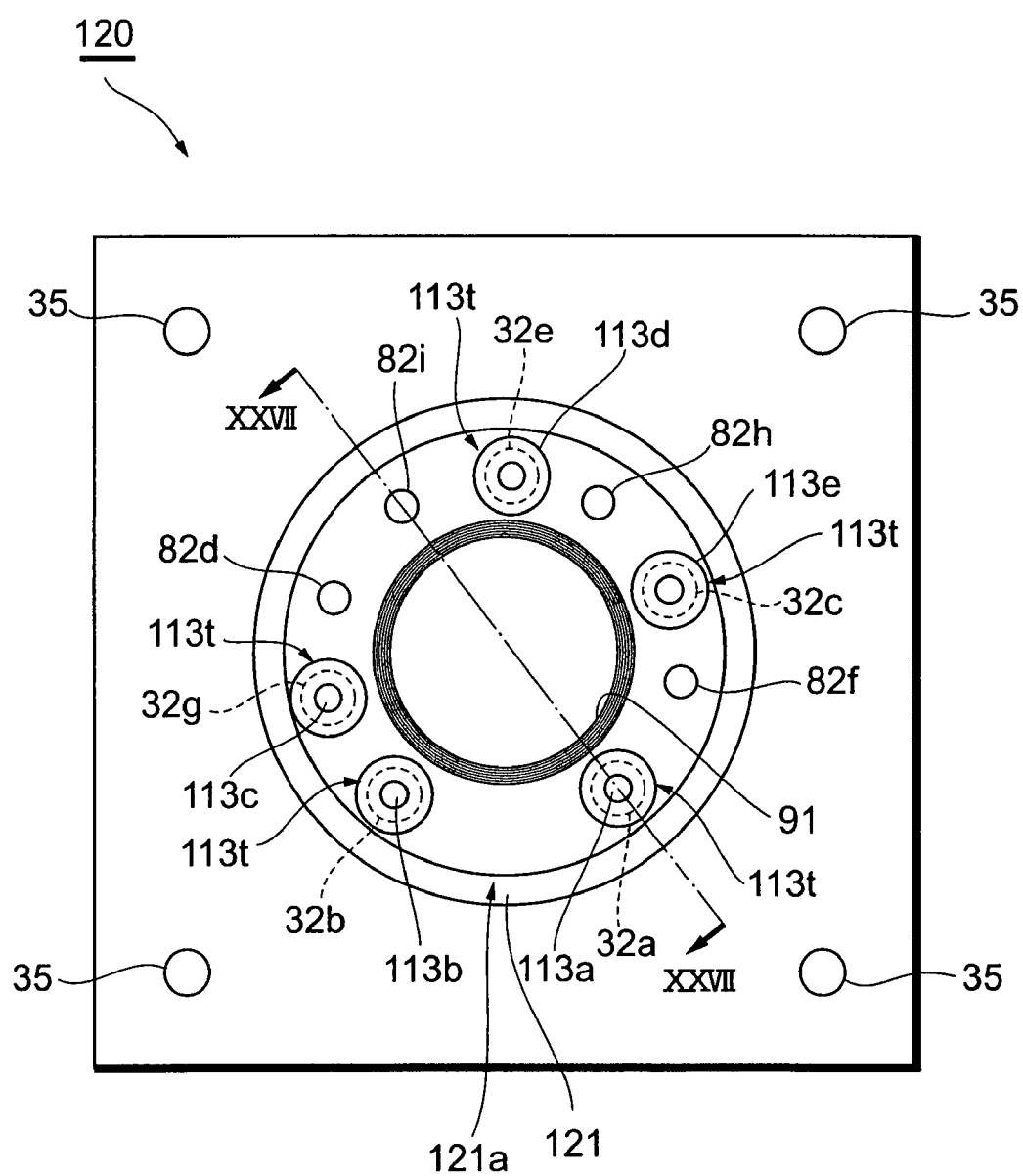
FIG. 26 is a front view of a structure of a heat insulating socket member in a tenth embodiment of a light source apparatus according to the present invention.
Figure 27:
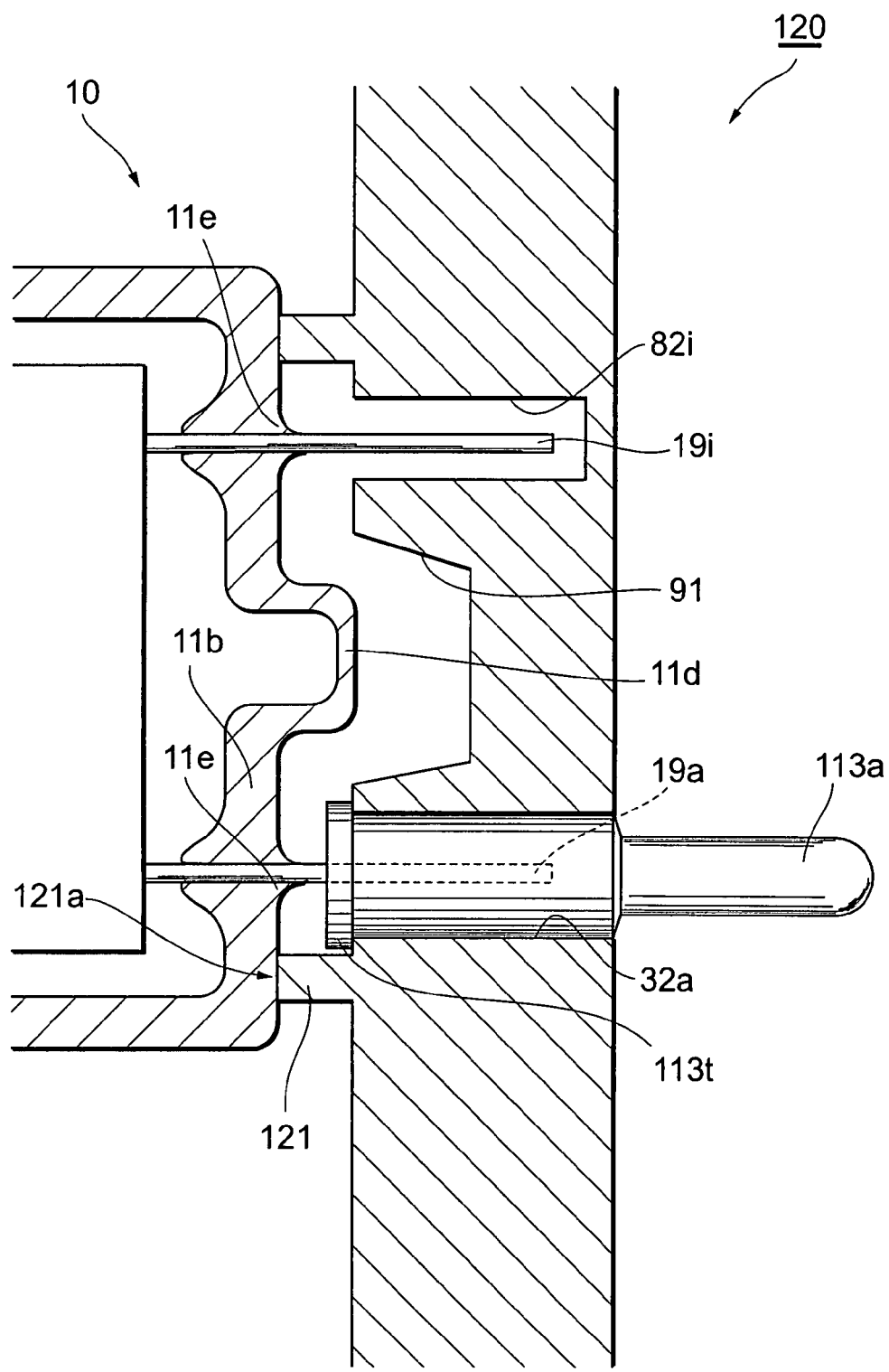
FIG. 27 is a diagram of a sectional structure along line XXVII-XXVII of the heat insulating socket (FIG. 26) in the state in which the deuterium lamp is fixed.

A tenth embodiment of a light source apparatus according to the present invention shall now be described with reference to FIG. 26 and FIG. 27. FIG. 26 is a front view of a structure of a heat insulating socket member in the tenth embodiment of a light source apparatus according to the present invention. FIG. 27 is a diagram of a sectional structure along line XXVII-XXVII of the heat insulating socket (FIG. 26) in the state in which the deuterium lamp is fixed.

Points of difference of a light source apparatus according to the tenth embodiment with respect to the light source apparatus according to the seventh embodiment are that the heat insulating socket member 120 has an upright portion 121 that has an annular form and protrudes toward the front side and that the pin socket members 113$a$ to 113$e$, provided with the collar portions 113$t$ that become latched onto circumferential edge portions at the front sides of the stem pin entry portions 32$a$, 32$b$, 32$g$, 32$e$, and 32$c$, are provided. The pin socket members 113$a$ to 113$e$ have the same structure as the pin socket members 113$a$ to 113$e$ of the ninth embodiment.

The upright portion 121 is positioned at the outer side of the stem pin entry portions 32$a$, 32$b$, 32$c$, 82$d$, 32$e$, 82$f$, 32$g$, 82$h$, and 82$i$. The pin socket members 113$a$ to 113$e$ are inserted and attached in the stem pin entry portions 32$a$, 32$b$, 32$g$, 32$e$, and 32$c$ and the collar portions 113$t$ are latched to a front surface of the heat insulating socket member. The deuterium lamp 10 is detachably fixed to the heat insulating socket member 120. Specifically, as shown in FIG. 27, the stem portion 11$b$ is put in plane contact with an end surface (plane contacting portion) 121$a$ of the upright portion 121 and the evacuation tube portion 11$d$ and the stem pins 19$a$ to 19$i$ are respectively inserted in the evacuation tube entry portion 91 and the stem pin entry portions 32$a$, 32$b$, 32$c$, 82$d$, 32$e$, 82$f$, 32$g$, 82$h$, and 82$i$. The arrangement of the rest of the light source apparatus according to the tenth embodiment is the same as that of the light source apparatus 1 according to the first embodiment, and even with this structure, the same actions and effects as the light source apparatus 1 according to the first embodiment and the light source apparatus according to the seventh embodiment are exhibited.

Figure 28:
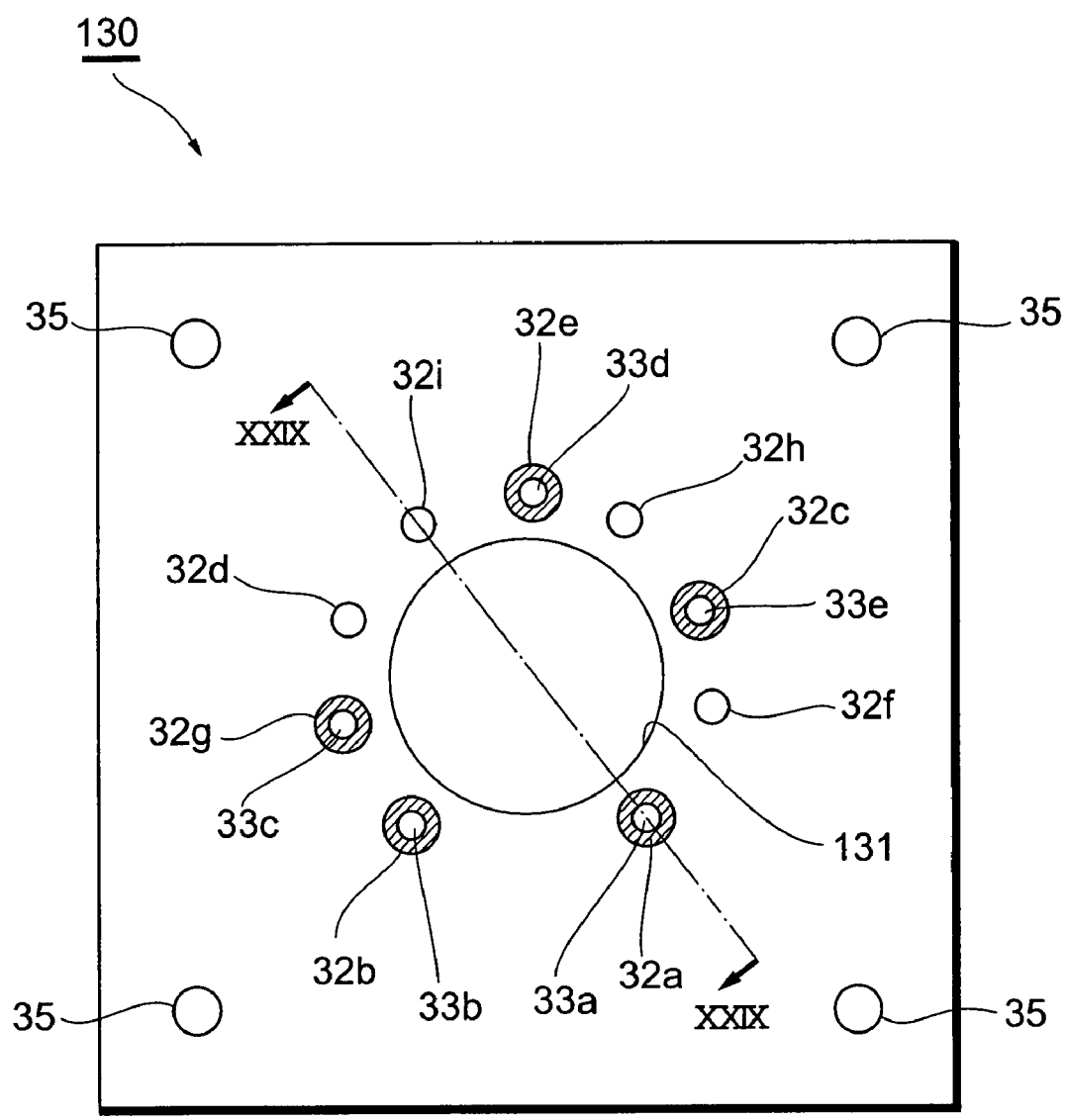
FIG. 28 is a front view of a structure of a heat insulating socket member in an eleventh embodiment of a light source apparatus according to the present invention.
Figure 29:
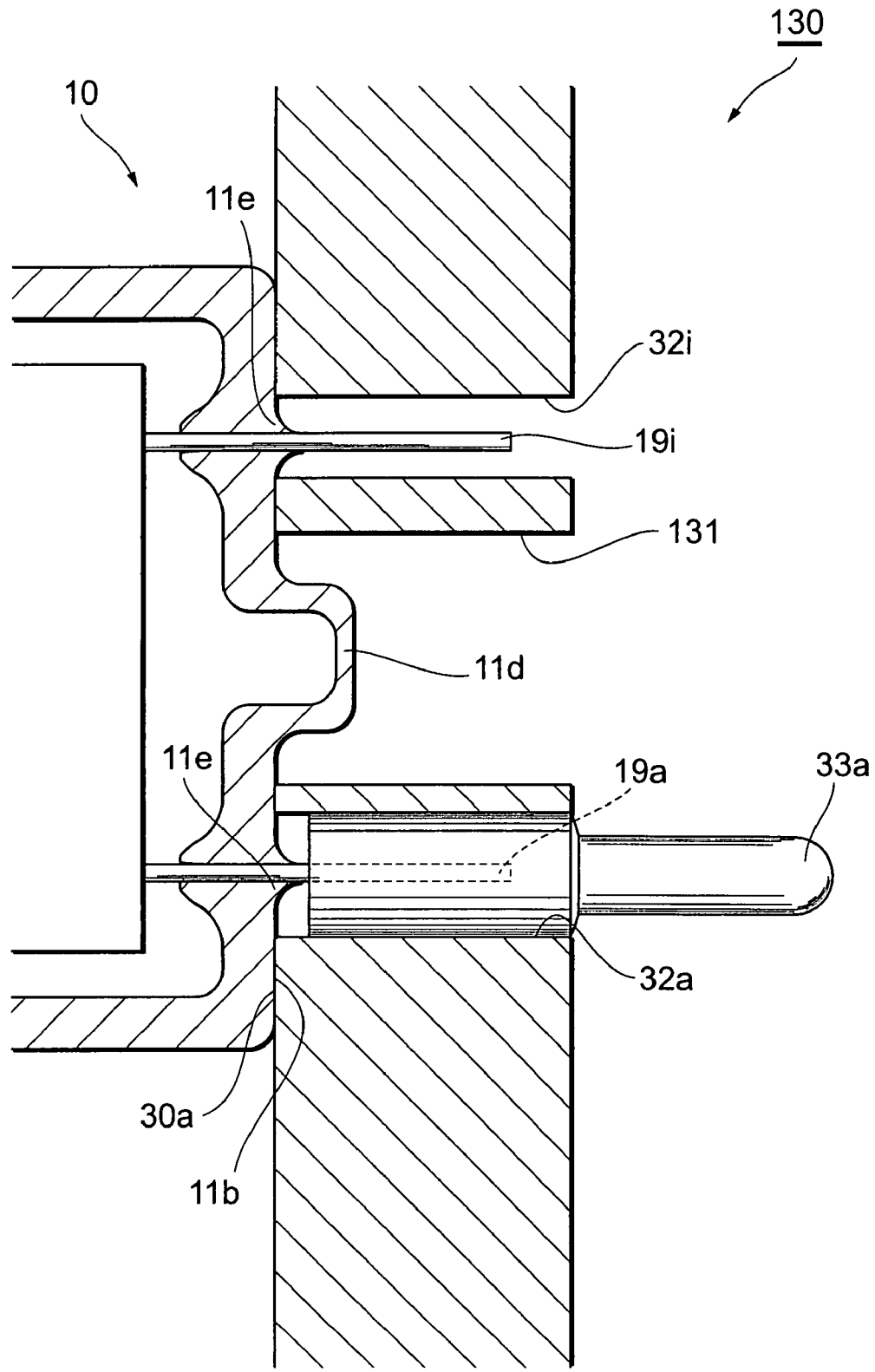
FIG. 29 is a diagram of a sectional structure along line XXIX-XXIX of the heat insulating socket (FIG. 28) in the state in which the deuterium lamp is fixed.

An eleventh embodiment of a light source apparatus according to the present invention shall now be described with reference to FIG. 28 and FIG. 29. FIG. 28 is a front view of a structure of a heat insulating socket member in the eleventh embodiment of a light source apparatus according to the present invention. FIG. 29 is a diagram of a sectional structure along line XXIX-XXIX of the heat insulating socket (FIG. 28) in the state in which the deuterium lamp is fixed.

A point of difference of a light source apparatus according to the eleventh embodiment with respect to the light source apparatus 1 according to the first embodiment is that in place of the heat insulating socket member 30, having the evacuation tube entry portion 31, the diameter of which increases from the back side to the front side, the heat insulating socket member 130, having an evacuation tube entry portion 131, the diameter of which is fixed from the back side to the front side, is applied. The arrangement of the rest of the light source apparatus according to the eleventh embodiment is the same as that of the light source apparatus 1 according to the first embodiment, and even with this structure, the same actions and effects as the light source apparatus 1 according to the first embodiment are exhibited.

Figure 30:
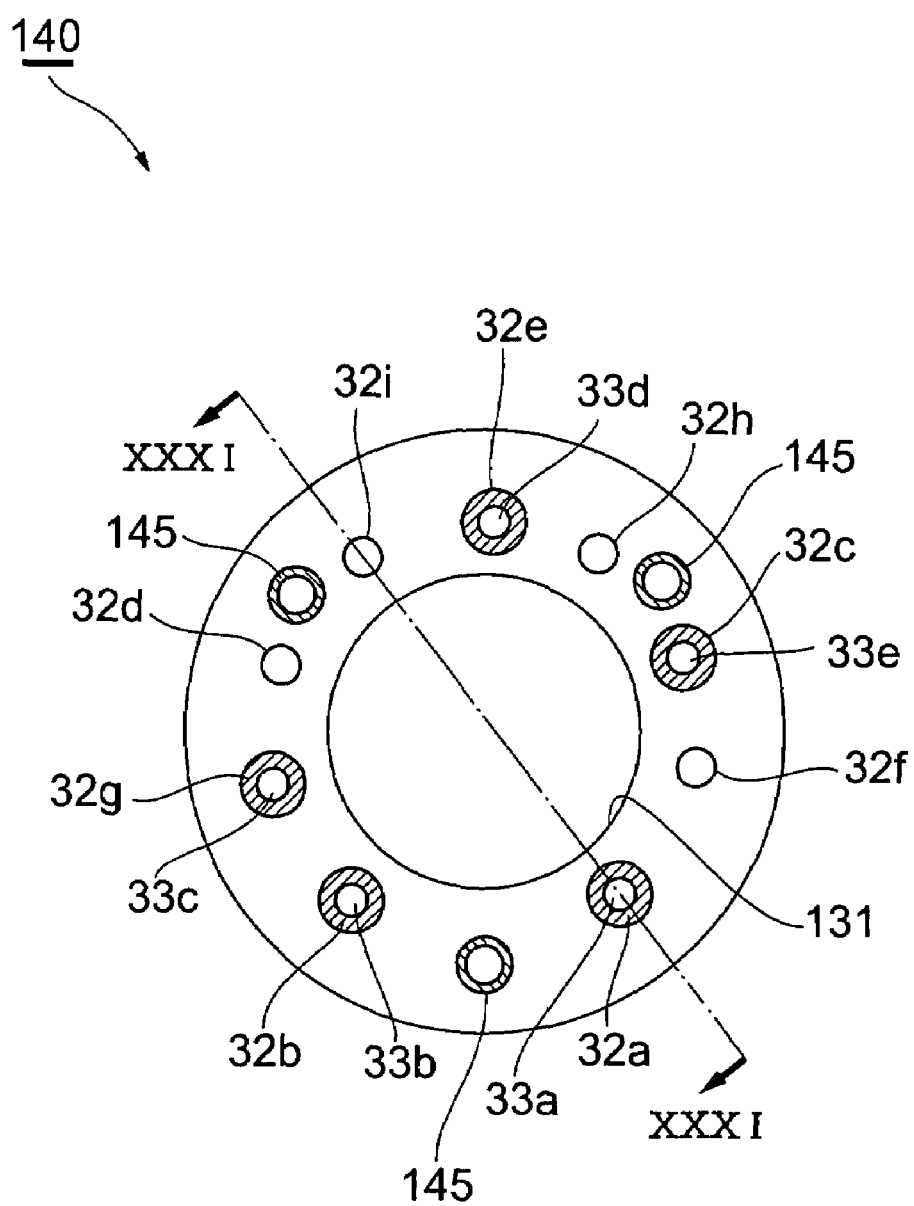
FIG. 30 is a front view of a structure of a heat insulating socket member in a twelfth embodiment of a light source apparatus according to the present invention.
Figure 31:
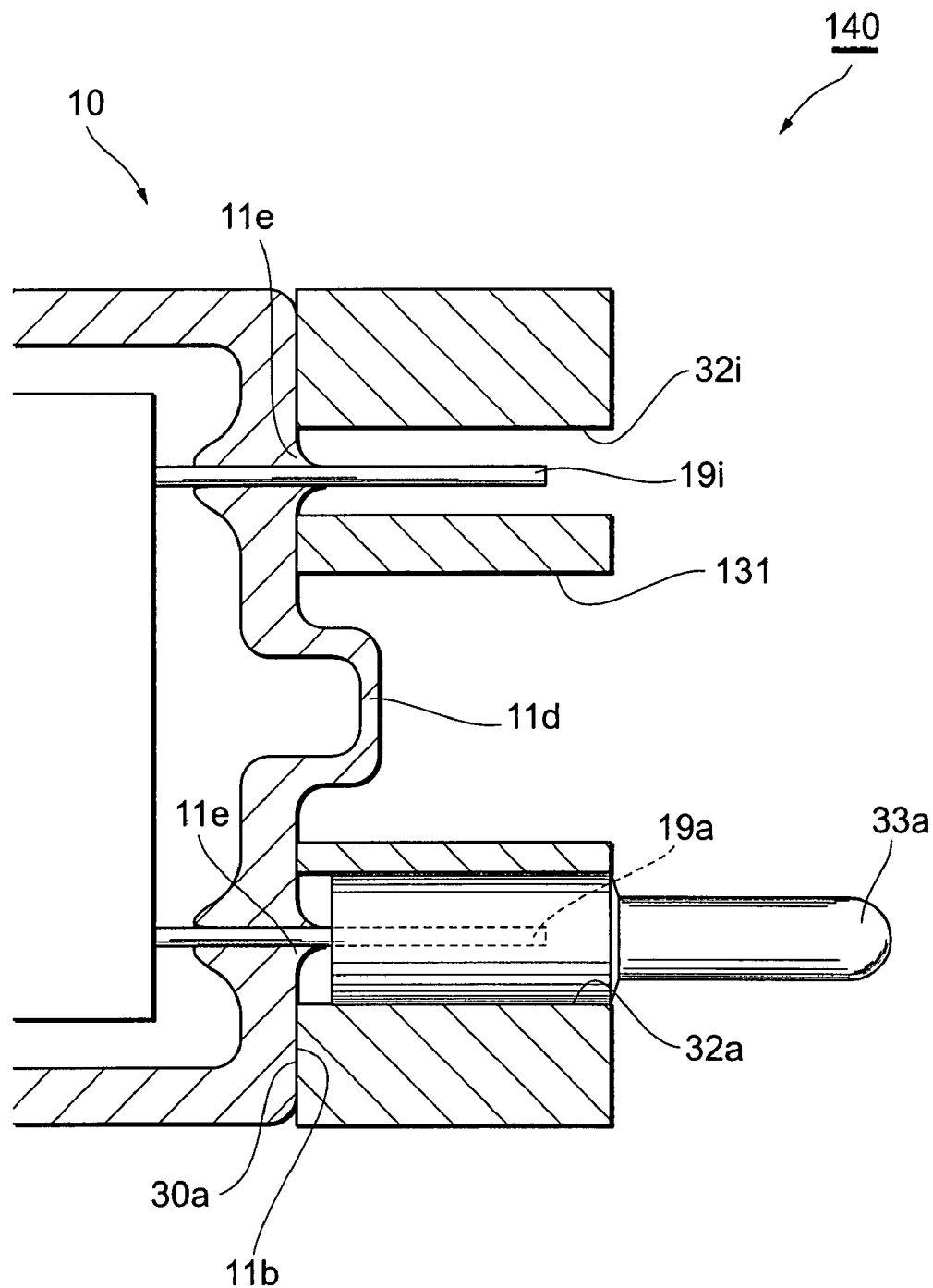
FIG. 31 is a diagram of a sectional structure along line XXXI-XXXI of the heat insulating socket (FIG. 30) in the state in which the deuterium lamp is fixed.

A twelfth embodiment of a light source apparatus according to the present invention shall now be described with reference to FIG. 30 and FIG. 31. FIG. 30 is a front view of a structure of a heat insulating socket member in the twelfth embodiment of a light source apparatus according to the present invention. FIG. 31 is a diagram of a sectional structure along line XXXI-XXXI of the heat insulating socket (FIG. 30) in the state in which the deuterium lamp is fixed.

Points of difference of a light source apparatus according to the twelfth embodiment with respect to the light source apparatus according to the eleventh embodiment is that in place of the heat insulating socket member 130, having a rectangular outer shell shape, the heat insulating socket member 140, having a circular outer shell shape, is employed and that positions of openings 145 for insertion of male screws for fixing the heat insulating member 140 to the lamp fixing plate are changed. The outer diameter of the heat-socket member 140 has a size corresponding to the diameter of the stem portion 11b. The arrangement of the rest of the light source apparatus according to the twelfth embodiment is the same as that of the light source apparatus 1 according to the first embodiment, and even with this structure, the same actions and effects as the light source apparatus 1 according to the first embodiment and the light source apparatus according to the eleventh embodiment are exhibited.

Although the present invention was described specifically based on a plurality of embodiments above, the present invention is not restricted to the above-described embodiments. For example, although in the above-described embodiments, the lamp boxes 20, 40, 50, 60, and 70 all have a box-like shape, these may have a cylindrical shape or other shape instead.

Also, although the head-on type deuterium lamp 10 is indicated as the gas discharge tube in the above-described embodiments, a side-on type deuterium lamp may be used instead. In such a case, a light emitting portion is provided in a side surface plate 24, 54, 64, or 74. Other gas discharge tubes besides these may also be applied.

Furthermore, although in the above-described embodiments, the material of the heat insulating socket members 30, 80, 90, 100, 110, 120, 130, and 140 is a polyether ether ketone resin material, a heat insulating socket member, comprised of another material having a heat insulating property and an electrical insulating property, may be used instead.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The present invention is applicable to light sources of analyzing apparatuses, semiconductor inspection apparatuses, and various other inspection apparatuses.

The invention claimed is:

1. A light source apparatus comprising: a gas discharge tube, having a stem portion that holds a plurality of stem pins in penetrating states; a lamp container housing said entire gas discharge tube in an interior space defined by inside walls thereof; and an insulating socket member disposed between said gas discharge tube and an inner wall of said lamp container and being fixed in a state of being positioned with respect to said lamp container,
   wherein said lamp container includes a lamp fixing plate for fixing said insulating socket member to said lamp container, said lamp fixing plate having an opening that is provided at a center portion thereof and exposes a central portion of said insulating socket member,
   wherein said insulating socket member is comprised of an electrically insulating material, said insulating socket member having a first surface holding said gas discharge tube, a second surface that opposes said first surface and is closely fixed to said lamp fixing plate, and a plurality of through holes communicating said first surface and said second surface,
   wherein said insulating socket member, as a structure for fixing said gas discharge tube in a detachable state, has:
   a plane contacting portion, corresponding to said first surface of said lamp fixing plate, put in plane contact with said stem portion of said gas discharge tube; and
   a pin socket member provided in correspondence to one of said stem pins and in which the corresponding stem pin is inserted in an electrically connected state while part of the corresponding stem pin is inserted into one of said through holes from the first surface side of said insulating socket member and one end of said pin socket member is inserted into the one of said through holes, inserted with the part of the corresponding stem pin, from the second surface side of said insulating socket member, and
   wherein the other end of said pin socket member protrudes from said second surface of said insulating socket member through said opening of said lamp fixing plate.

2. A light source apparatus according to claim 1, further comprising a base having a surface on which said lamp container is fixed,
   wherein said lamp container has a box-like shape and has wall surfaces that are substantially orthogonal to said base, and
   wherein said insulating socket member is fixed to a wall surface of said lamp container.

3. A light source apparatus according to claim 1, wherein said gas discharge tube has an evacuation tube portion extending from said stem portion toward the exterior of said gas discharge tube, and
   wherein said insulating socket member has an evacuation tube entry portion for entry of said evacuation tube portion.

4. A light source apparatus according to claim 1, wherein said insulating socket member has a stem pin entry portion for entry of at least one of said stem pins, and
   wherein said pin socket member is inserted in and attached to at least one stem pin entry portion.

5. A light source apparatus according to claim 1, wherein said lamp container has a light emitting portion that transmits light from said gas discharge tube, and
   wherein said light source apparatus has a lens held in said light emitting portion.

* * * * *